United States Patent [19]
Sugaya et al.

[11] Patent Number: 5,970,485
[45] Date of Patent: Oct. 19, 1999

[54] NEWS CLIPPING METHOD AND SYSTEM

[75] Inventors: Natsuko Sugaya, Kawasaki; Hisamitsu Kawaguchi, Hadano; Noriyuki Yamasaki, Yokohama, all of Japan

[73] Assignee: Hitachi, Ltd., Tokyo, Japan

[21] Appl. No.: 08/891,064

[22] Filed: Jul. 10, 1997

[30]     Foreign Application Priority Data

Jul. 11, 1996   [JP]   Japan ................................ 8-201348

[51] Int. Cl.⁶ .................................................. G06F 17/30
[52] U.S. Cl. ........................................ 707/4; 703/3; 703/5
[58] Field of Search ........................ 707/1–10, 100–104, 707/200–206; 704/7, 8, 9, 256

[56]           References Cited

U.S. PATENT DOCUMENTS

| | | | |
|---|---|---|---|
| 5,051,886 | 9/1991 | Kawaguchi et al. | 707/6 |
| 5,168,533 | 12/1992 | Kato et al. | 382/229 |
| 5,278,981 | 1/1994 | Kawaguchi et al. | 707/6 |
| 5,519,857 | 5/1996 | Kato et al. | 707/5 |
| 5,675,788 | 10/1997 | Husick et al. | 707/104 |
| 5,717,914 | 2/1998 | Husick et al. | 707/5 |
| 5,721,902 | 2/1998 | Schultz | 707/4 |
| 5,737,734 | 4/1998 | Schultz | 707/5 |
| 5,742,816 | 4/1998 | Barr et al. | 707/104 |

OTHER PUBLICATIONS

Communications of the ACM, Jun. 1975, vol. 18, No. 6, "Efficient String Matching: An Aid to Bibliographic Search", A. Aho et al, pp. 333–340.

*Primary Examiner*—Ruay Lian Ho
*Attorney, Agent, or Firm*—Fay, Sharpe, Beall, Fagan, Minnich & McKee

[57]           ABSTRACT

A method of fast clipping, despite of large number of users, can be achieved through analyzing query expressions, storing the number of query terms included in the query expressions in a term number count table, generating a finite automaton for matching the terms occurring in text data with all terms included in the query expressions, generating a user identifier table for storing the identifiers of users in association with the terms included in the query expressions, matching the terms by scanning the text data by the finite automaton, calculating for each user the occurrence count of terms occurring in the text data as substrings coincident with the terms included in the query expressions made to the user identifier table, storing the calculated occurrence count in the term occurrence count region of the table, comparing the calculated term occurrence count of the table with the number of terms included the query expressions, and when a match is found from the comparison, delivering the text data to the user.

21 Claims, 29 Drawing Sheets

⟨CONTENTS OF QUERY EXPRESION REGISTRATION CONTROL PROGRAM 106⟩

USER NUMBER 1 :  「 ("text" and "retrieval") or ("text" and "search") 」
                    ─────────────────────    ─────────────────────
                          FIRST MEMBER              SECOND MEMBER USER NUMBER 2 :  「 "edit" and ¬ "text" and ¬ "data" 」
                    ───────────────────────────────
                              FIRST MEMBER USER NUMBER 3 :  「 ¬ ( "retrieval" and "data" ) 」
                      ───────────────────────
                            FIRST MEMBER

⟨EXAMPLE OF QUERY TERM COUNTING TABLE 120⟩

⟨CONTENTS OF TEXT RETRIEVAL CONTROL PROGRAM 112⟩

⟨CONTENTS OF SEARCHING AUTOMATON GENERATION PROGRAM 109⟩

(CONTENTS OF TEXT RETRIEVAL PROGRAM 114)

⟨EXAMPLE OF QUERY EXPRESSION CHECKING PROCESS IN QUERY TERM NUMBER COUNT TABLE 120⟩

⟨EXAMPLE OF FORMED TEXT⟩

⟨CONTENTS OF SYSTEM CONTROL PROGRAM 105A⟩

⟨CONTENTS OF DELIVERY CONDITION REGISTRATION CONTROL PROGRAM 2100⟩

⟨EXAMPLE OF DELIVERY CONDITION TABLE 2108⟩

⟨CONTENTS OF TEXT RETRIEVAL CONTROL PROGRAM 112A⟩

⟨CONTENTS OF TEXT DELIVERY CONTROL PROGRAM 2104⟩

⟨CONTENTS OF TEXT DELIVERY PROGRAM 2105⟩

⟨CONTENTS OF QUERY EXPRESSION ELIMINATION
CONTROL PROGRAM 3100⟩

⟨CONTENTS OF USER LIST CORRECTION PROGRAM 3101⟩

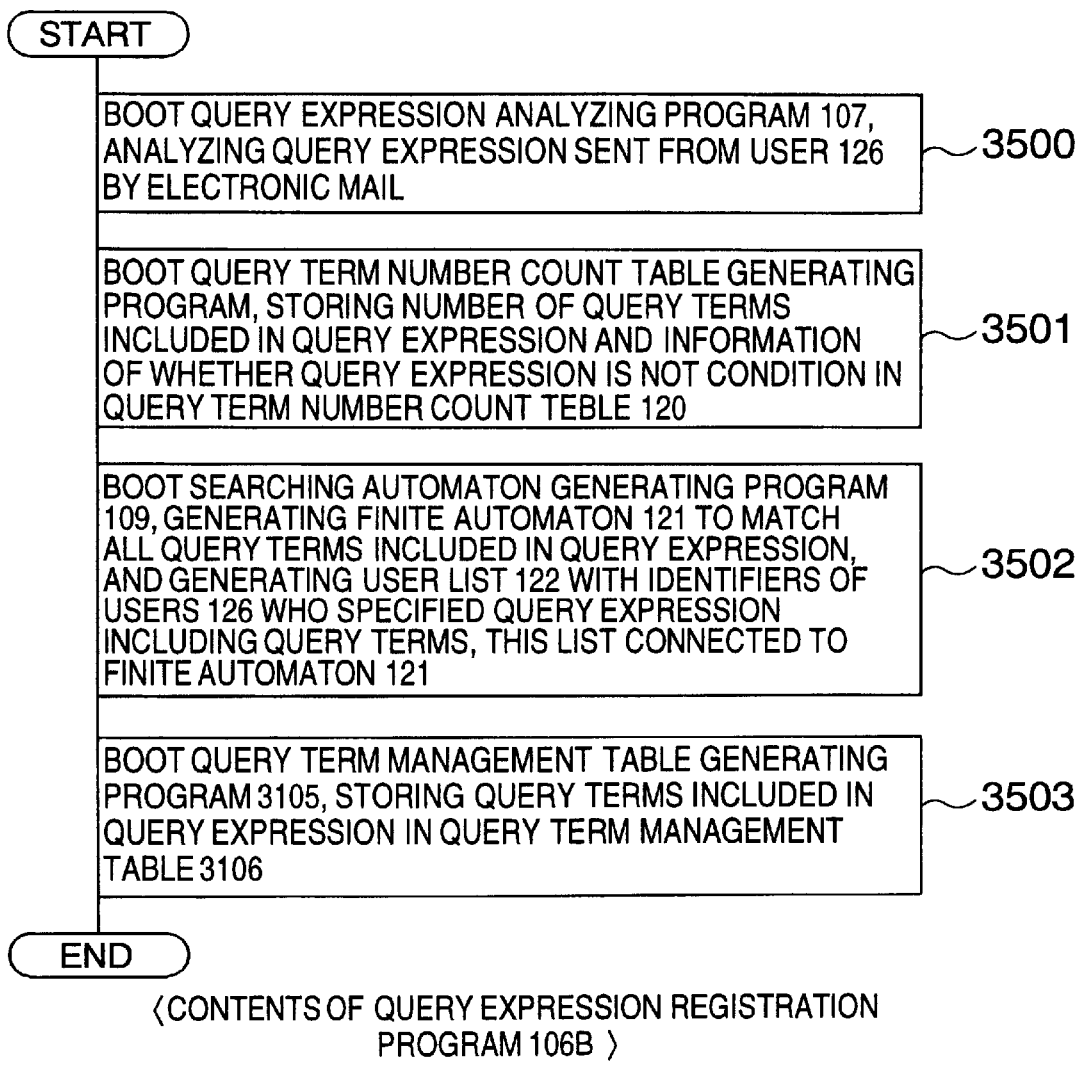

FIG. 34
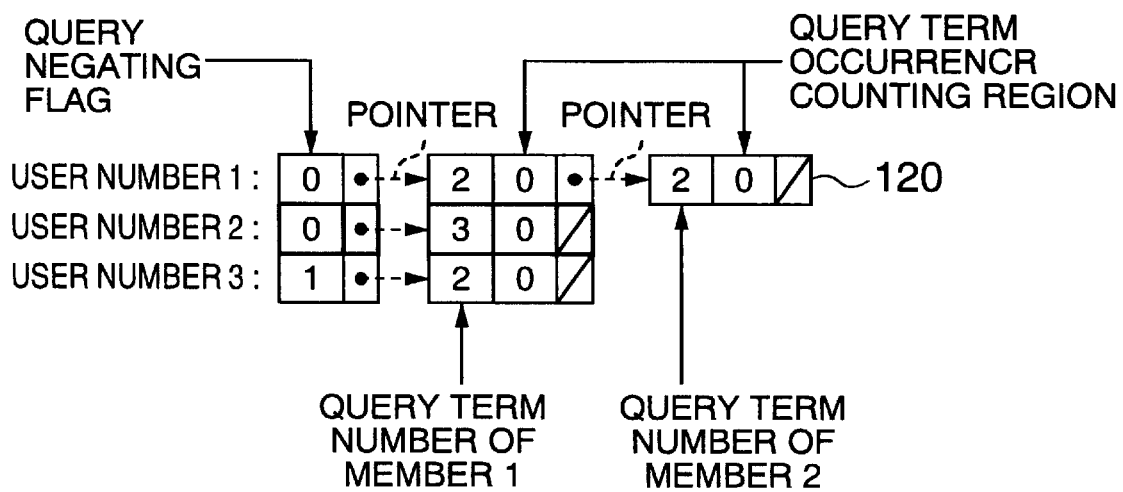
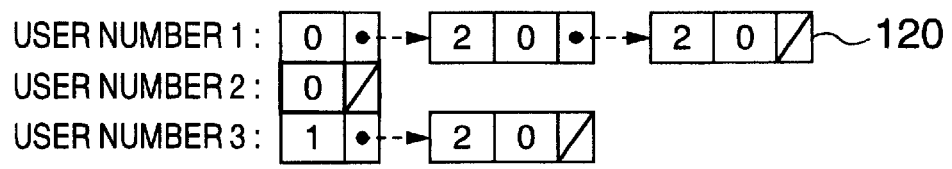

FIG. 35

USER NIMBER 2 : 「 "pattern" and "matching" 」

⇩ EXTRACT

「 pattem 」 , 「 matching 」

⇩ STORE

| USER NIMBER 1 | USER NIMBER 2 | USER NIMBER 3 |
|---|---|---|
| text retrieval search | pattern matching | retrieval data |

~3106

NEWS CLIPPING METHOD AND SYSTEM

BACKGROUND OF THE INVENTION

The present invention generally relates to news clipping systems which use query expressions previously registered by users to search for any one of texts acquired from a plurality of news sources such as news agencies and news paper publishing companies through electronic mail or information collection robot, and distribute the texts to the user associated with the satisfied query expression. The present invention particularly relates to a news clipping system having a fast, instant text-retrieval and-distribution function capable of searching out, by once scanning, all the texts which the users need even though the number of users is increased.

Recently, a large quantity of electronic document (hereinafter, called text) has been distributed every moment to the user by means of electronic mail, electronic news or others. In addition, the number of news sources for supplying information through the Internet has been increased, and thus an information collection robot or the like is required to collect an enormous amount of text from these news sources. Therefore, there is an imminent need to provide a news clipping system for instantly distributing the related text to the user.

The core of this news clipping system is the document retrieval, which is specifically described in "Efficient String Matching: An Aid to Bibliographic Search", A. V. Aho, et al., communications of the ACM, June 1975, Vol. 18, No. 6, pp. 333–340.

This paper describes a kind of finite automata called pattern matching machine constructed from strings of keywords to be searched for (hereinafter, called query terms). This matching machine is able to locate all occurrences of any of a finite number of query terms in an arbitrary text string by once scanning. However, there are the following problems when texts are searched in accordance with the query expressions which a number of users request.

(1) User Identification Problem

If one finite automaton is constructed from all query terms included in the query expressions which a large number of users provide, all the query terms can be searched out by once scanning the texts. However, since it is uncertain which user's query expression contains the query terms coincident with strings of text, it is not possible to discriminate the satisfied user's query expression from the others.

(2) Process Time Problem

If a finite automaton is constructed from the query terms included in the query expression of each user, it is possible to discriminate the satisfied query expression from the others. However, since the texts must be scanned as many times as the finite automata number (namely, the number of users), the increase of the user number will make the retrieval take the more time.

SUMMARY OF THE INVENTION

It is an object of the invention to provide a news clipping system arranged to decide if the query expressions specified by a plurality of users are satisfied by once scanning the text data acquired from a plurality of news sources in accordance with the query expressions previously registered by the users, and distribute the text data to the users of which the query expressions are satisfied.

It is another object of the invention to provide a news clipping system capable of fast searching and distributing the text data in real time independently of the user number even though the user number is increased.

According to the invention, there is provided a news clipping method for a news clipping system to which query terms and text data are supplied, including a step of storing a plurality of query expressions each having a plurality of terms specified by a plurality of users, a step of providing a query term number count table having stored therein the number of query terms included in each of the plurality of query expressions of the users, a step of scanning the text data fed to the news clipping system in order to provide a user list 18 of users associated with query terms including terms common to said users, a step of providing a query term occurrence count table 16 having stored therein occurrence count of different query terms that are found for each user in the text data while the text data is being scanned with reference to the user list, and a step of comparing, for each user, the query term number of the query term number count table with the occurrence count of the query term occurrence count table to search for users whose query term number and occurrence count are coincident with each other. The text data can be distributed to the users whose query term number and occurrence count are coincident with each other. The text data scanning step is executed once before the text data distributing step.

There is also provided another news clipping method including a query expression registering step of registering query expressions which are specified by a plurality of users, and a text clipping step of deciding if the query expressions are satisfied in the text data when the text data is acquired, and distributing the text data to the user who specified the query expression satisfied by the above decision, wherein the text clipping step can decide if the query expressions are satisfied in the text data by scanning the text data a smaller number of times.

The query expression registering step includes a query expression analyzing step of extracting all query terms from the query expressions, a step for generating a query term number count table for storing management information including the users and the numbers of all the query terms extracted from the query expressions of the users, a step of generating a multiple strings matching table to which reference is made when all the query terms extracted from the query expressions are matched while the text data is being once scanned, and a step of generating a user list including identifiers of the users who specified the query expressions, in association with the query terms extracted from the query expressions.

The text clipping step includes a step of scanning the text data with reference to the multiple strings matching table when decision is made of whether or not the query expressions are satisfied in the text data, thereby matching all the query terms extracted by the query expression analyzing step, and a step of deciding if the query expressions are satisfied in the text data by referring to the query terms matched by the text scanning step, the user list and the query term number count table.

The multiple strings matching table is a finite automaton.

The query expression deciding step includes a step of calculating for each user the number of query terms matched by the text scanning step with reference to the user list, and a step of comparing the number of query terms calculated by the query term matching number calculating step with the number of query terms stored in the query term number count table, and deciding that the corresponding query expression including the query terms is satisfied when a coincidence is found from the comparison.

There is also provided another news clipping method including a step of registering query expressions which one or more users specified and ordered to match in text data from one or more news sources and each of which includes one or more query terms, and a text clipping step of deciding if the query expressions are satisfied in the text data when text data is acquired and distributing the text data to the users of which the query expressions are satisfied, wherein a step is further provided of registering delivery condition expressions for text distribution which one or more users or system operators specified.

The text clipping step includes a text retrieval step of deciding if the plurality of query expressions are satisfied in the text data by only once scanning, and a text delivery control step of distributing the text data to the user of which the query expression is found to be satisfied by the text retrieval step, when the delivery condition registered by the delivery condition registering step is satisfied.

The delivery condition expression registering step includes a delivery condition expression analyzing step of extracting identifiers of users who need to specify delivery conditions, and the associated delivery conditions from the delivery condition expressions, and a step of generating a delivery condition table which has stored therein the user's identifiers and delivery conditions which are extracted from the delivery condition expressions at the delivery condition analyzing step.

The text delivery control step includes a step of deciding if the delivery conditions are satisfied referring to the delivery condition table, and a step of distributing the text data to the user when the delivery condition is decided to be satisfied by the distribution condition deciding step.

The delivery conditions include delivery time, number of items to be distributed, and delay time from text retrieval to distribution.

There is also provided another news clipping method including a step of registering query expressions which include one or more query terms and which one or more users specified and ordered to match in text data acquired from one or more news sources, and a text clipping step of deciding if the query expressions are satisfied in the text data when the text data is acquired, and distributing the text data to the users whose query expressions are satisfied, wherein a step is further provided of eliminating the query expression when the query expression is ordered to be eliminated.

The query expression registering step includes a query expression analyzing step of extracting all the query terms from the query expressions, a step of generating a query term number count table which has stored therein management information including the users, the number of all the query terms extracted from the query expressions of the users, a step of generating a multiple strings matching table to which reference is made when text data is once scanned so that the corresponding terms occurring during the scanning can be matched with all the query terms extracted from the query expressions, and a step of generating a user list having identifiers of the users who specified the query expressions and the query terms extracted from the query expressions, those being connected as a list in association with each other.

The query expression eliminating step includes a query expression management table eliminating step of eliminating information associated with elimination-indicated ones of the query expressions from the query term number count table and the user list.

The query expression registering step further includes a step of generating a query term management table which has stored therein the query terms extracted by the query expression analyzing step.

The query expression management table eliminating step includes a user list eliminating step of eliminating from the user list the identifiers of the users who specified the query expressions associated with the query terms included in the elimination-indicated query expressions with reference to the query term management table, and a query term number count table eliminating step of eliminating management information of the users associated with the elimination-indicated query expressions from the query term number count table.

There is also provided a news clipping system including means for registering query expressions which include one or more query terms and which one or more users specified, and text clipping means for deciding if the query expressions are satisfied in the text data when the text is acquired, and distributing the text data to the users whose query expressions are satisfied, wherein the text clipping means includes text retrieval means for deciding if the plurality of query expressions are satisfied in the text data by only once scanning the text data.

The query expression registering means includes query expression analyzing means for extracting all query terms from the query expressions, query term number count table generating means for generating a query term number count table which has stored therein management information including the users and the number of all the query terms extracted from the query expressions of the users, means for generating a multiple strings matching table to which reference is made when text data is once scanned so that the corresponding terms occurring during the scanning can be matched with all the query terms extracted from the query expressions, and means for generating a user list having identifiers of the users who specified the query expressions and the query terms extracted from the query expressions, those being connected as a list in association with each other.

The text clipping means includes text scanning means for scanning the text data with reference to the multiple strings matching table to match the corresponding terms occurring during the scanning with all the query terms extracted by the query expression analyzing means when decision is made of whether or not the query expressions are satisfied in the text data, and means for deciding if the query expressions are satisfied in the text data by referring to the query terms matched by the text scanning means, the user list and the query term number count table.

The multiple strings matching table is a finite automaton.

The query expression deciding means includes query term matching number calculating means for calculating, for each user, with reference to the user list, the number of query terms matched by the text scanning means, and query term number comparing means for comparing the number of query terms calculated by the query term matching number calculating means with the number of query terms stored in the query term number count table, and deciding that the associated query expression including the query terms is satisfied when a coincidence occurs between those numbers.

There is also provided a news clipping system including means for registering query expressions which include one or more query terms and which one or more users specified and ordered to match in the text data from one or more news sources, text clipping means for deciding if the query expressions are satisfied in the text data when the text data is acquired, and distributing the text data to the users whose query expressions are satisfied, wherein another means is further provided for registering delivery condition expressions for text distribution which one or more users or system operators specified.

The text clipping means includes text scanning means for deciding if the plurality of query expressions are satisfied in the text data by scanning only once the text data, and text distribution control means for distributing the text data to the user whose query expression is satisfied by the text scanning means when the corresponding one of the delivery conditions registered by the delivery condition expression registering means is satisfied.

The delivery condition expression registering means includes delivery condition expression analyzing means for extracting the identifiers of the users who need to specify delivery conditions and the delivery conditions from the delivery condition expressions, and means for generating a delivery condition management table which has stored therein the user identifiers and the delivery conditions extracted from the delivery condition expressions by the delivery condition analyzing means.

The text distribution control means includes delivery condition deciding means for deciding if the delivery conditions are satisfied with reference to the delivery condition management table, and text delivery means for distributing the text data to the corresponding user when the delivery condition is decided to be satisfied by the delivery condition deciding means.

The delivery conditions include distribution time, number of items to be distributed and delay time from text retrieval to distribution.

There is also provided a news clipping system including means for registering query expressions which include one or more query terms and which are specified by one or more users in order to search text data acquired from one or more news sources, and text clipping means for deciding if the query expressions are satisfied in the text data when the text data is acquired, and distributing the text data to the user whose query expression is satisfied, wherein query expression eliminating means is further provided for eliminating the query expression when the query expression is ordered to eliminate.

The query expression registering means includes query expression analyzing means for extracting all query terms from the query expressions, query term number count table generating means for generating a query term number count table which has stored therein management information including the users and the number of all query terms extracted from the query expressions of the users, and multiple strings matching table generating means for generating a multiple strings matching table to which reference is made when the associated terms occurring in text data are matched with all the query terms extracted from the query expression formulas by scanning only once the text data, user list generating means for generating a user list having the identifiers of the users who specified the query expressions and the query terms extracted from the query expressions, those being connected as a list in association with each other.

The query expression eliminating means includes query expression management table eliminating means for eliminating information associated with the elimination-indicated query expressions from the query term number count table and the user list.

The query expression registering means includes means for generating a query term management table having stored therein the query terms extracted from the query expression analyzing means.

The query expression management table eliminating means includes user list eliminating means for eliminating from the user list the identifier of the user who specified the query expression associated with the query terms included in the elimination-indicated query expression with reference to the query term management table, and query term number count table eliminating means for eliminating management information associated with the elimination-indicated query expressions from the query term number count table.

BRIEF DESCRIPTION OF THE DRAWINGS

FIG. 18 is a PAD diagram showing the process contents of a system control program 105a.

FIG. 21 is a PAD diagram showing the process contents of a text retrieval control program 112a.

FIG. 31 is a PAD diagram showing the process contents of a query expression registration control program 106b.

FIG. 32 is a construction diagram of a query term management table 3106.

FIG. 34 is a diagram for explaining the query term number count table correction process.

FIG. 35 is a diagram for explaining the query term management table generating process.

DESCRIPTION OF THE PREFERRED EMBODIMENTS

Embodiments of the invention will be described with reference to the accompanying drawings.

First Embodiment

The first embodiment will be briefly described with reference to FIG. 1.

The query expression registration process will first be mentioned below.

A query expression is analyzed, and query terms are extracted from the query expression. Then, the number of the extracted query terms is stored in a query term number count table by the query term number count table generating process.

Figure 1:
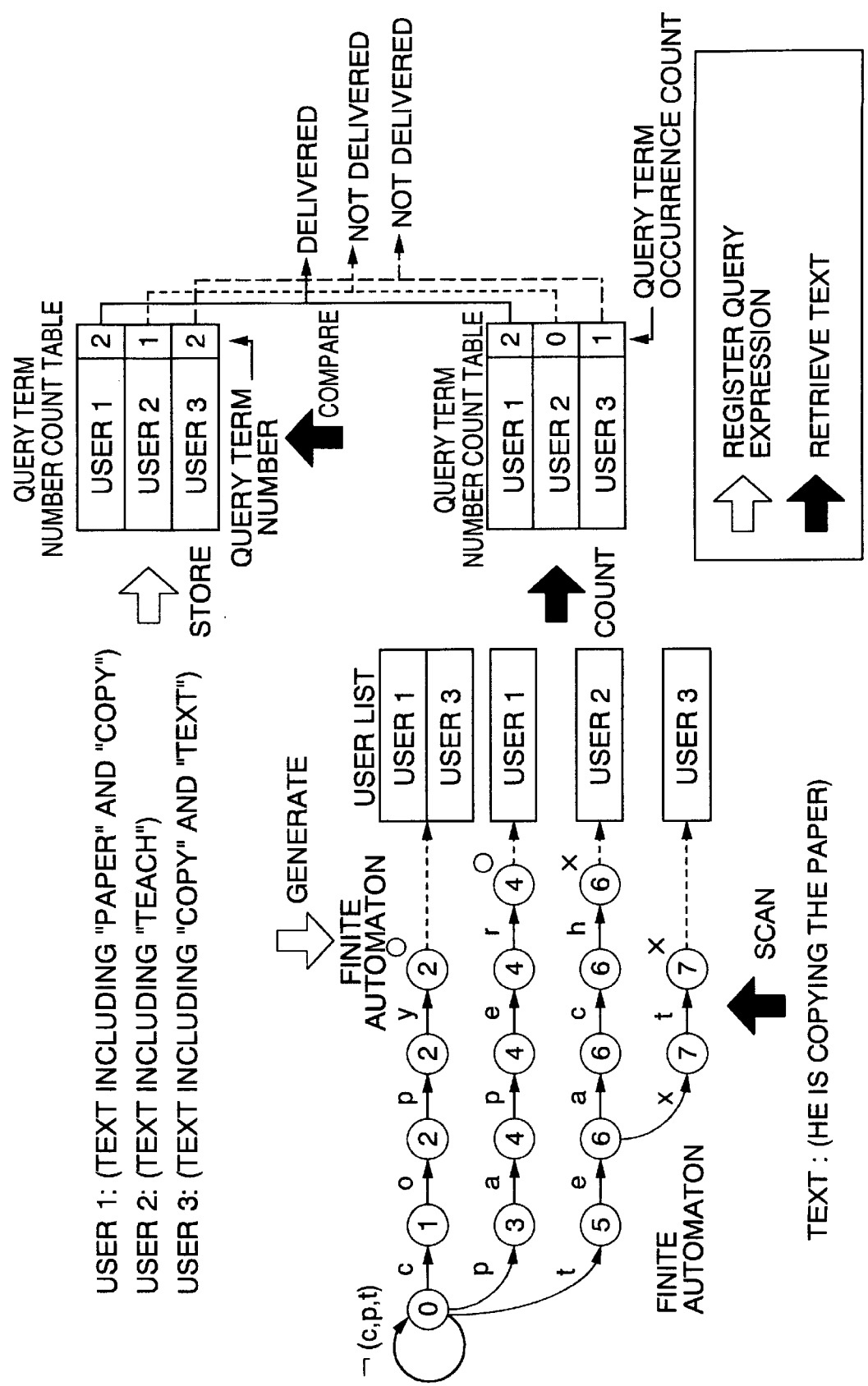
FIG. 1 is a diagram showing the summary of the process according to the invention.

For example, referring to FIG. 1, the query expression [texts including "paper" and "copy"] of user 1 includes two query terms of "paper" and "copy", and thus 2 is stored in the region corresponding to the user 1 of the query term number count table. Similarly, 1 and 2 are respectively stored in the regions corresponding to the users 2, 3.

The finite automaton production process is executed to produce a finite automaton for checking all the query terms extracted by the above query expression analysis. This finite automaton is the same as in the prior art.

FIG. 1 also shows the state transition of the finite automaton for matching in text data the query terms of "paper", "copy", "teach", and "text" extracted from the query expressions [text including "paper" and "copy"], [text including "teach"] and [text including "copy" and "text"] of users 1, 2 and 3.

Then, the user list production process is performed to connect the finite automaton to the user list of user identifiers of the users who specified those query terms. For example, in FIG. 1, when "copy" is checked, reference is made to the user list relative to the end state 4, so that the "user 1" and "user 3" who specified "copy" are detected.

The text retrieval and delivery process will be described.

In this process, the text scan process first scans the texts to match the query terms.

For example, when the text of [He is copying the paper] is scanned by use of the finite automaton shown in FIG. 1, it is detected that a substring coincident with "paper" and "copy" occurs in the text. In the illustrated automaton, the query term marked with "o" at the end state indicates appearance of and associated substring in the text, and the query term marked with "x" indicates no appearance of an associated substring in the text.

In this embodiment, since a substring coincident with "paper" and "copy" appears in the text, the end states 2 and 4 are marked with "o".

Then, the query term number count process is executed to count the number of times that the substring corresponding to the query term of each user occurs in the text.

For example, since both "copy" and "paper" which the user 1 requested are included in the text, the number of times is counted as 2. As to the user 3, only the query term "copy" which the user 3 requested is included in the text, and thus the number of times is counted as 1. In addition, since the query term which the user 2 requested is not included in the text, the number of times is counted as 0.

Finally, the query expression checking process is performed to compare the query term number stored in the query term number count table and the query term occurrence count calculated in the query term number count process. If they are coincident with each other, the text is distributed to the user according to the text distribution process.

As for example shown in FIG. 1, since the query term number, 2 of only the user 1 is equal to the occurrence count, the text is distributed to the user 1, but no text is distributed to the user 2 and user 3 because the query numbers of the users 2, 3 do not equal to their counts.

According to this embodiment, the text is scanned by use of a definite automaton, and the number of times that the query terms occur as substrings in the text is counted for each user while reference is being made to the user's list.

Then, it is checked if the query expression of each user is satisfied by comparing the counted result and the query term number previously stored in the query term number count table.

As a result, since it is possible to decide if the query expressions of a plurality of users are satisfied after the text is only once scanned, the text can be searched and distributed at higher speed.

The first embodiment of the invention will be described in detail with reference to FIG. 2.

The news clipping system according to the invention includes a display 100, a keyboard 101, a central processing unit (CPU) 102, a main memory 104, and a bus 103 connecting these elements.

The bus 103 also connects these elements through a communication network 124 such as LAN (Local Area Network) to a news source 125 which distributes news, and users 126 who make use of the news clipping system.

The news source 125 supplies news data as electronic text to this system by means of electronic mail or electronic news, and posts up texts on the Internet. The users 126 register query expressions on this system by means of electronic mail.

This system searches the texts so that decision is made of if the query expressions are satisfied in the texts, and distributes the satisfied texts to the associated users by means of electronic mail.

Although the news source 125 supplies texts to this system by means of electronic mail as described in this embodiment, the news source 125 may make only the operation of posting up texts on the Internet, and instead the texts can be collected by a news collection robot.

The main memory 104 has stored therein a system control program 105, a query expression registration control program 106, a query expression analyzing program 107, a query term number count table generating program 108, a searching automaton generation program 109, a text retrieval control program 112, a text acquisition program 113, a text retrieval program 114, a text forming program 118, an electronic mail program 119, a query term number count table 120, a finite automaton 121 and a user list 122. In addition, this main memory has a work area 123.

The searching automaton generation program 109 is constructed by a finite automaton generating program 110 and a user list generating program 111.

The text retrieval program 114 is constructed by a text scanning program 115, a query term number count program 116 and a query expression checking program 117.

The above programs may be stored in a storage medium capable of reading and writing data on a computer, such as a hard disk apparatus (not shown) or floppy disk (not shown).

The system control program 105 is booted according to the command from the operator of the news clipping system by pressing keys on the keyboard 101.

The query expression registration control program 106 and text retrieval control program 112 are booted by the system control program 105 when the user 126 orders the query expression to be registered or when texts are supplied from the news source 125, thus controlling a set of the query expression analyzing program 107, query term number count table generating program 108 and searching automaton generation program 109 and a set of the text acquisition program 113, text retrieval program 114 and text forming program 118, respectively.

The electronic mail program 119 is an existing mail program which is generally used in work-stations and so on.

This electronic mail program 119 is booted by the system control program 105 in accordance with the result of the processing in the text retrieval control program 112.

A description will be made of the process contents of the news clipping system of this embodiment.

Figure 3:
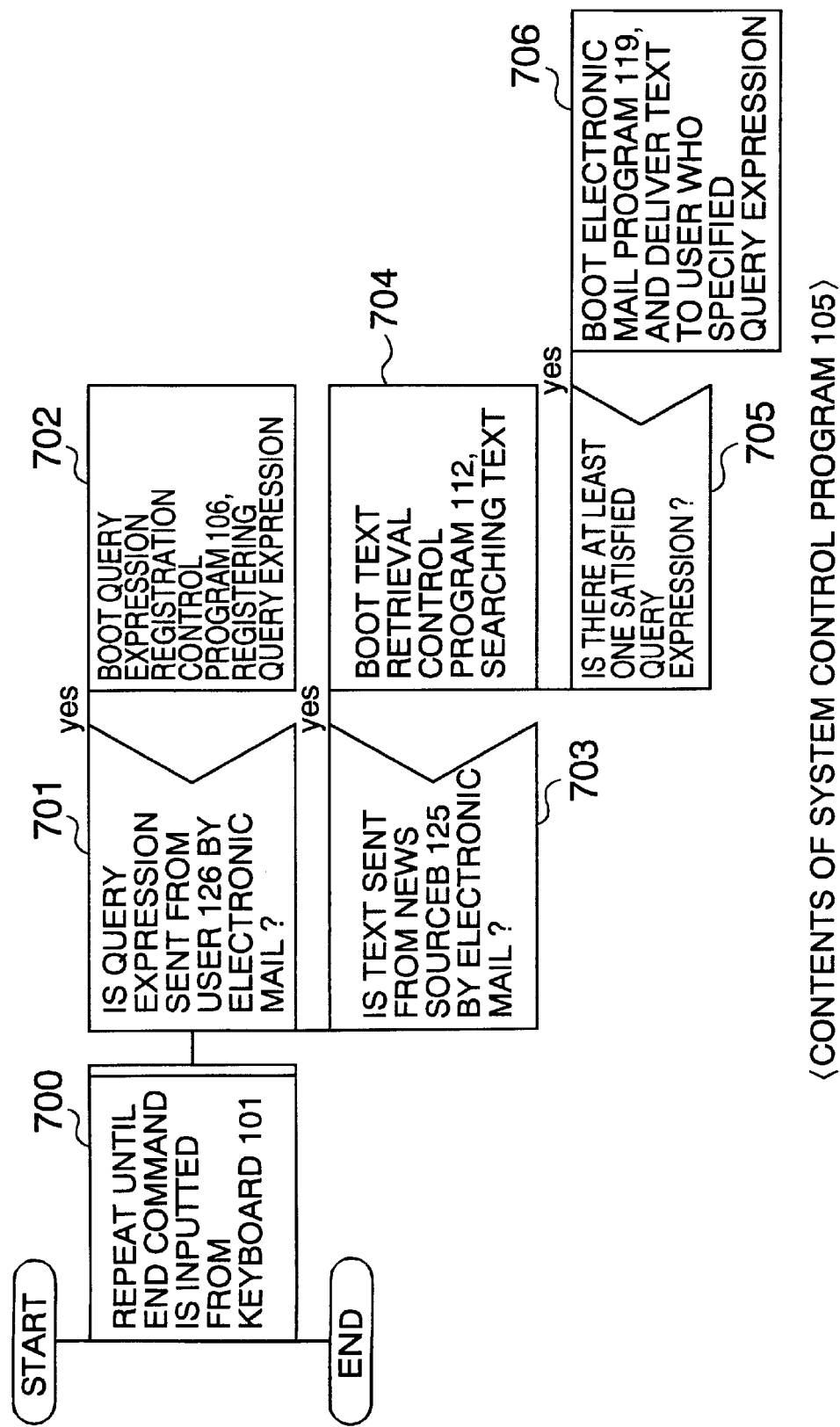
FIG. 3 is a PAD diagram showing the process contents of a system control program 105.

First, the process contents of the system control program 105 will be mentioned with reference to the PAD (Problem Analysis Diagram) of FIG. 3.

In the system control program 105, at step 700 the following steps are repeated until the end command is inputted through the keyboard 101.

That is, at step 701 it is checked if a query expression has been sent from the user 126 by means of electronic mail.

Here, if any query expression has been transmitted, the program goes to step 702, where the query expression registration control program 106 is booted, and the query expression is registered.

Then, at step 703, it is checked if texts have been sent from the news source 125 by means of electronic mail.

Here, if the texts have been sent, the program goes to step 704, where the text retrieval control program 112 is booted, and the texts are searched.

Then, at step 705, the result of searching the texts in the text retrieval control program 112 is examined, and if it is decided that there is one or more satisfied query expressions, the program goes to step 706. Here, the electronic mail program 119 is booted, and the corresponding text is distributed by means of electronic mail to the user who specified the satisfied query expression.

The above operations are the process contents of the system control program 105.

Figure 4:
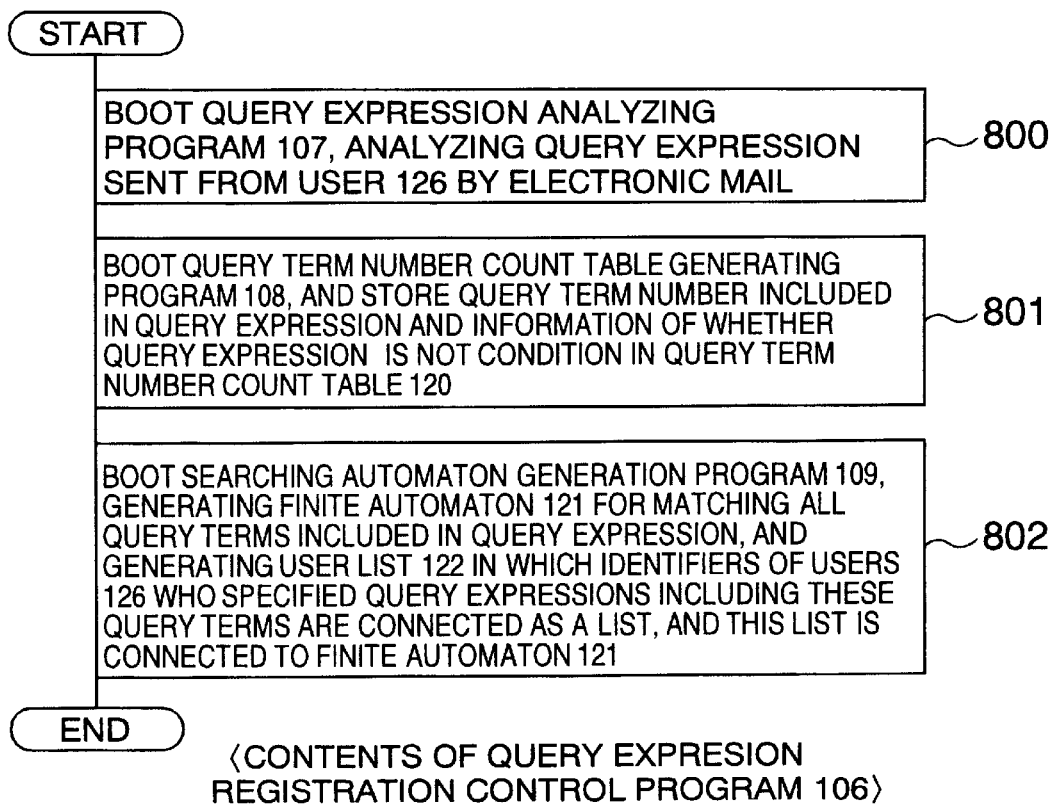
FIG. 4 is a PAD diagram showing the process contents of a query expression registration control program 106.

The process contents of the query expression registration control program 106 for query expression registration will be described with reference to the PAD diagram of FIG. 4.

The query expression registration control program 106 is booted by the system control program 105.

In this program, at step 800 the query expression analyzing program 107 is booted, and the query expression sent from the user 126 by means of electronic mail is analyzed.

In the process for analyzing this query expression the query expression is expanded into any one of the following forms.

(a) Only a single query term,
(b) The AND of a plurality of query terms at (a), and
(c) The OR of a plurality of query terms at (a) and a plurality of ANDs at (b). In other words, the query expression is expanded so that the AND condition cannot be added to the outside of the OR condition.

However, a NOT condition is added to the whole query expression or query term.

Here, the AND condition, for example, the query expression of ["paper" and "copy"] means "search texts so that decision is made of if substrings of both "paper" and "copy" appear in the text". The OR condition, for example, the query expression of ["paper" or "copy"] means "search texts so that decision is made if substrings of either "paper" or "copy" occur in the text".

The NOT condition, for example, the query expression [¬ "copy"] means "search texts in which no "copy" appears".

For example, if "A", "B", "C", "D" and "E" represent query terms can be expanded into the following forms.

(a) A
(b) A and B and C and . . .
(c) (A and B) or C or (D and E) or . . .

Figure 5:
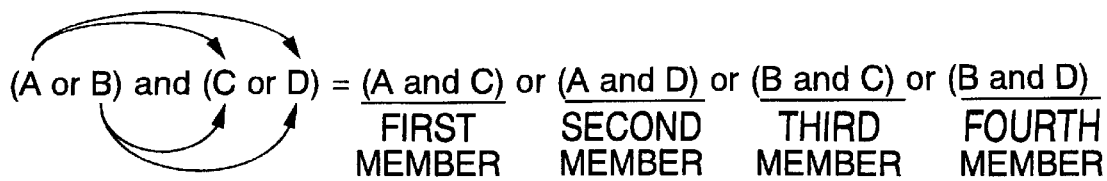
FIG. 5 is a diagram for explaining the method of analyzing query expressions.

For example, if a query expression is the AND of ORs, or if a AND condition is added to the outside of the OR condition, the query expression is expanded as shown in FIG. 5, or changed to satisfy the above conditions.

Here, the AND condition or single query term is called member.

At step 801, the query term number count table generating program 108 is booted by the query expression registration control program 106, detecting the number of query terms included in the query expression and information whether the NOT condition is added to the query expression or not, resulting from analyzing by the query expression analyzing program 107, and making them be stored in the query term number count table 120.

This query term number count table 120 is a table in which the number of query terms included in each query expression is stored in association with each member.

Figure 6:
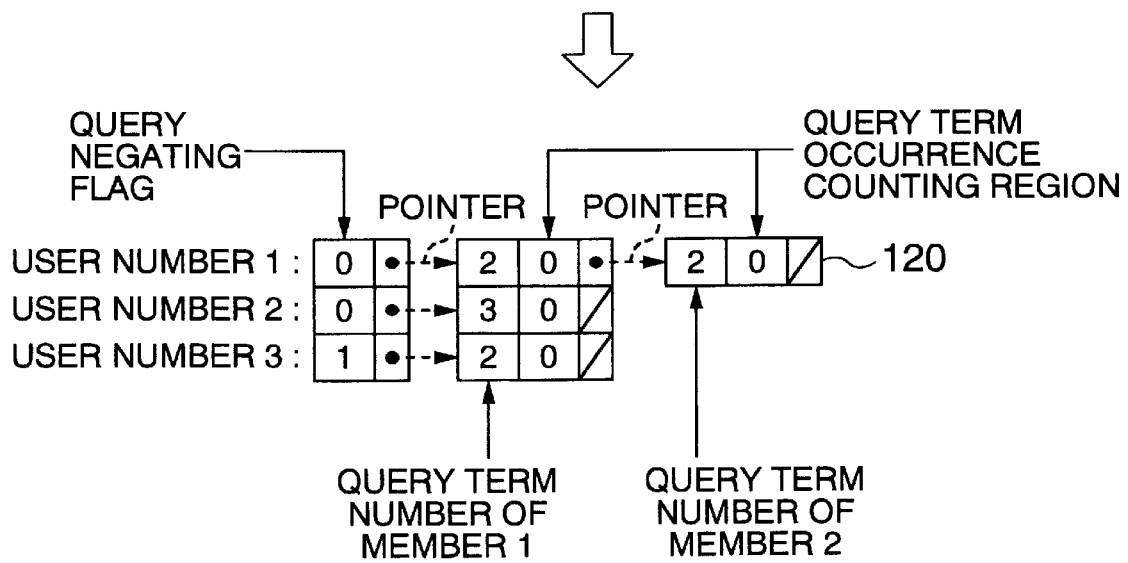
FIG. 6 is a diagram for explaining the method of producing a query term number count table 120.

FIG. 6 shows its structure.

The query term number count table 120 shown in FIG. 6 is produced for three query expressions of user number 1: [("text" and "retrieval") or ("text" and "search")], user number 2: ["edit" and ¬ "text" and ¬ "data"] and user number 3: [¬ ("retrieval" and "data")].

First, a query negating flag is provided as the head element in this query term number count table 120.

This query expression negating flag is 1 when a NOT condition is added to the whole query expression, and 0 if not so.

As for example as illustrated, the flag in the user number 3 is 1 since a NOT condition is added to the whole query expression of user number 3, and the flags in the other query expressions are 0 since no NOT condition is added to the whole query expression.

This query expression negating flag is connected to the number of query terms included in the first member, to that in the second member, and so on in turn as a list.

For example, the number of query terms included in the first member of the query expression is stored in the second element of the list of user number 1, or 2 is stored since two query terms of "text" and "retrieval" are included in the first term.

In addition, the number of query terms, or 2 included in the second member is stored in the next element of the list.

In the second and following elements, there are provided regions for counting the number of occurrences of substrings coincident with the terms specified by the user in the text when the text is searched, in addition to the regions for the number of query terms specified by the user.

Finally, at step 802 the searching automaton generation program 109 is booted by the query expression registration control program 106, generating the finite automaton 121 which matches all the query terms included in the query expression obtained as s result of analyzing the query expression analyzing program 107.

Moreover, the user list 122 is generated which has the identifiers of users 126 who specified the query expressions including the query terms, and this list is connected to the finite automaton 121.

The process contents of this searching automaton generation program 109 will be described later in detail.

The above operations are the process contents of the query expression registration control program 106 for query expression registration.

The process contents of the text retrieval control program 112 for text retrieval will now be described with reference to the PAD diagram of FIG. 7.

The text retrieval control program 112 is booted by the system control program 105.

In this program, at step 1100 the text acquisition program 113 is booted, making the text sent from the news source 125 by means of electronic mail be stored in the work area 123.

Then, at step 1101 the text retrieval program 114 is booted, searching the text stored in the work area 123 by use of the query term number count table 120 which the query term number count table generating program 108 generates, and the finite automaton 121 and user list 122 which the searching automaton generation program 109 generates.

The process contents of this text retrieval program 114 will be described later in detail.

At step 1102, the result of searching the text in the text retrieval program 114 is examined, and if at least one query expression is satisfied, the program goes to step 1103. At this step, the text forming program 118 is booted, shaping the text stored in the work area 123 into the form in which it can be distributed according to the electronic mail program 119.

The above operations are the process contents of the text retrieval control program 112 for text retrieval.

With reference to the PAD diagram of FIG. 8, a description will be made of the process contents of the searching automaton generation program 109 in the query expression registration process according to the query expression registration control program 106 shown in FIG. 4.

Figure 8:
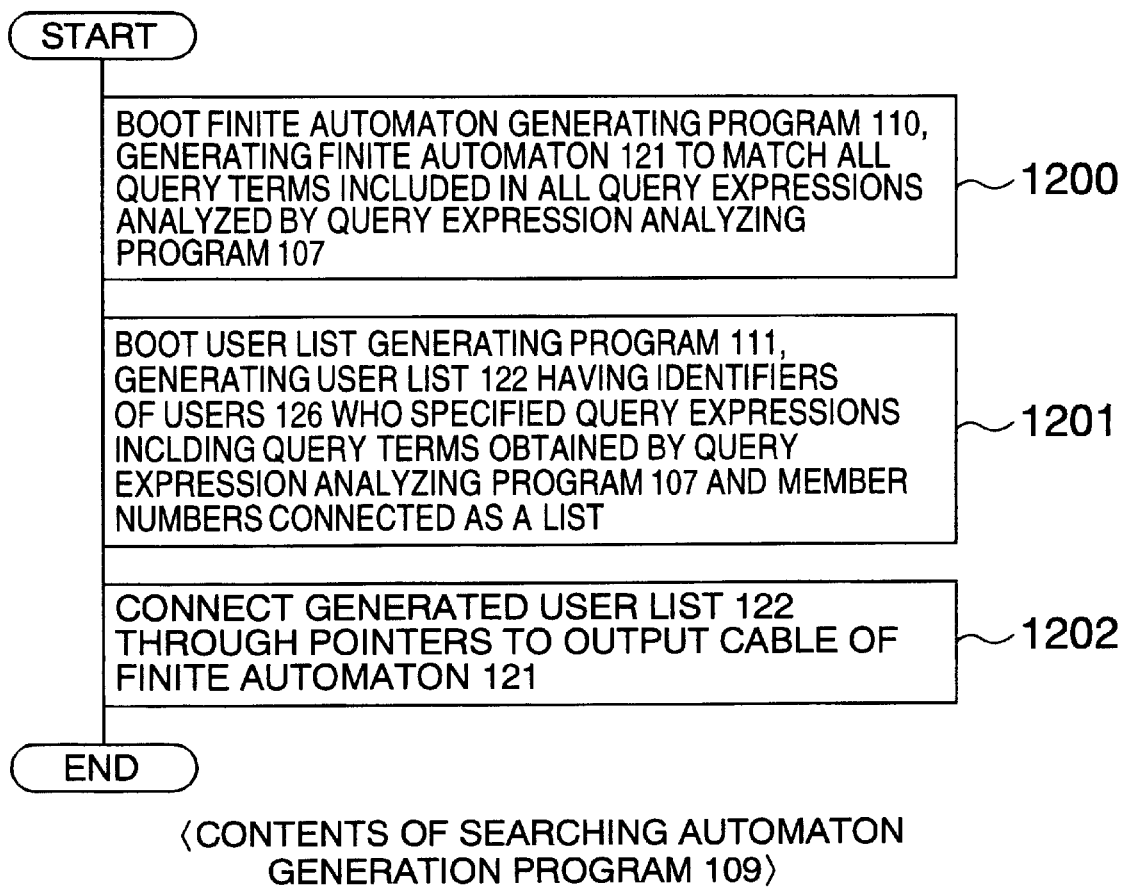
FIG. 8 is a PAD diagram showing the process contents of a searching automaton production program 109.

In the searching automaton generation program 109 shown in FIG. 8, at step 1200 the finite automaton generating program 110 is booted, generating the finite automaton 121 by which associated substrings occurring in text are matched with all the query terms extracted according to the search condition expression analyzing program 107.

This finite automaton 121 can be generated by the method disclosed in the prior art.

At step 1201, the user list generating program 111 is booted, generating the user list 122 from the identifiers of users 126 (user numbers) who specified the query expressions including the query terms which the query expression analyzing program 107 extracted, and the numbers of the members (member numbers) including the query terms. At step 1202, the user list is connected through pointers to the output table of the finite automaton 121.

Figure 9:
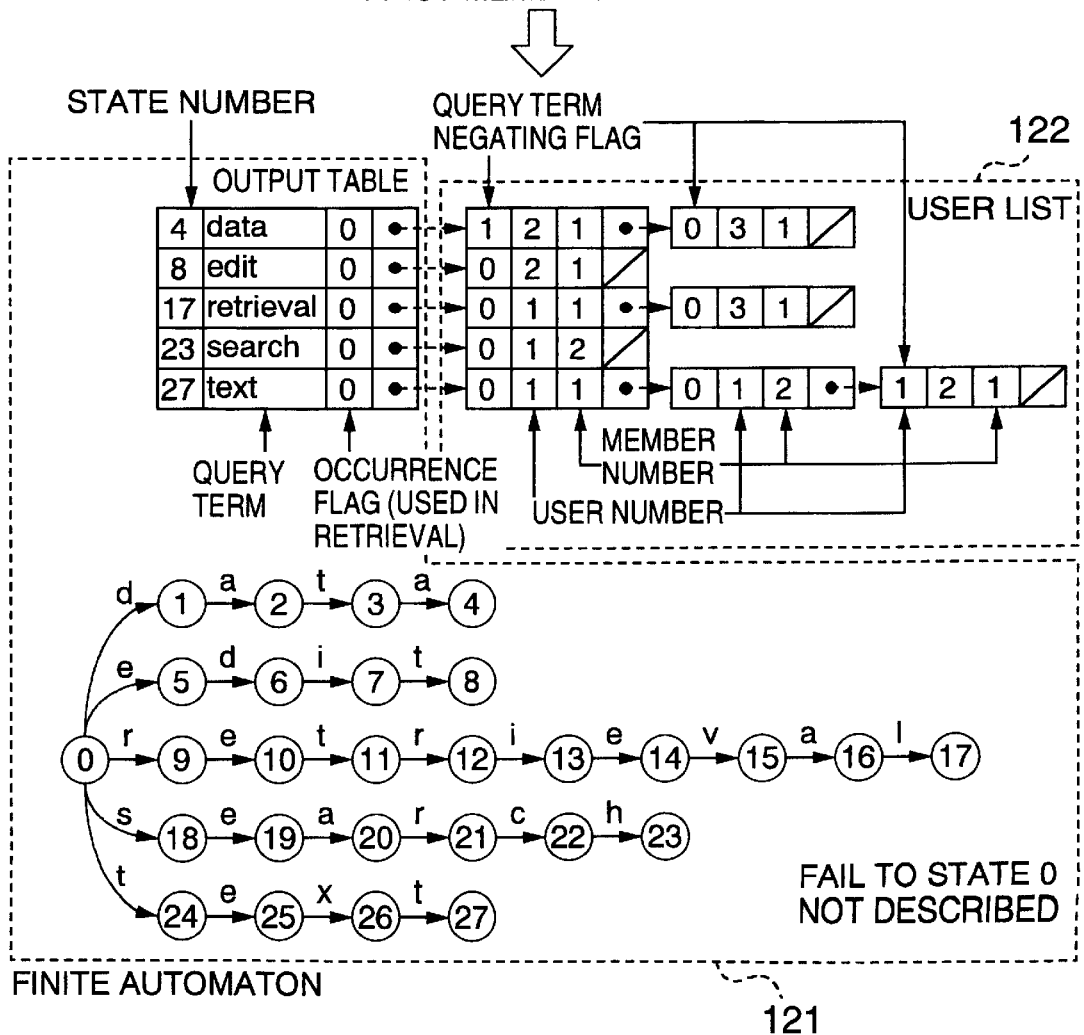
FIG. 9 is a diagram for explaining the method of producing a finite automaton 121 and user list 122.

FIG. 9 shows an example of the finite automaton 121 and user list 122 generated from the three query expressions which were used in explaining the query term number count table 120.

The finite automaton illustrated in FIG. 9 collates the five query terms of "text", "retrieval", "search", "edit", "data" included in the query expressions.

This finite automaton 121 is similar to those shown in the prior art, but different in its output table.

An occurrence flag is provided in the output table in association with each state number. This occurrence flag is 0 when texts are started to scan, and 1 when a substring coincident with any one of the terms occurs.

In addition, pointers are provided at the end of the output table, pointing the user list 122 having connected as a list the user number and member number of the query expressions including the associated query terms.

Each element of the user list 122 has a query term negating flag which is 1 when a NOT condition is added to the query term in the query expression, and 0 if not so.

As, for example, illustrated in FIG. 9, the query term of "text" in the query expression of user number 1 has no NOT condition at the member numbers 1 and 2, and the query term of "text" in the query expression of user number 2 has a NOT condition at the member number 1.

With reference to the PAD diagram of FIG. 10, a description will be made of the process contents of the text retrieval program 114 for text retrieval process in the text retrieval control program 112 shown in FIG. 7.

In the text retrieval program 114, as illustrated, at step 1400 the query term occurrence number counting region provided in the query term number count table 120, and the occurrence flag provided in the output table of finite automaton 121 are set to 0 for the initial setting of text retrieval.

At step 1401, the text scanning program 115 is booted, scanning the texts stored in the work area 123 by use of the finite automaton 121 generated by the finite automaton generating program 110 and collating the query terms.

The query term matching process by use of this finite automaton 121 can be executed by the method disclosed in the prior art.

At this time, when a substring associated with a query term appears in the texts, the occurrence flag of the output table associated with the query term is set to 1.

Then, at step 1402 the query term number count program 116 is booted, counting the query term coincident with an associated substring occurring in the texts.

The query term counting is made such that, at each occurrence, 1 is added to the value in the query term occurrence number counting region of the query term number count table 120 which is associated with the user number and member number at 0 of query term negating flag along the user list 122 corresponding to the occurrence flag 1 provided on the output table.

At step 1403, counting is made of the query terms of which the associated substrings did not appear in the texts.

This counting process is made such that, at each term, 1 is added to the value in the query term occurrence counting region of the query term number count table 120 which is associated with the user number and member number at 1 of query term negating flag along the user list 122 corresponding to the occurrence flag 0 provided on the output table.

At step 1404, the query expression checking program 117 is booted, checking if the query expressions are satisfied with reference to the query term number count table 120.

If a query expression meets one of the two following conditions, it is considered to be satisfied.

Condition (1): the query expression negating flag is 0 (namely, a NOT condition is not added to the query expression), and there is at least one member number coincident with the query term number.

Condition (2): the query expression negating flag is 1 (namely, a NOT condition is added to the query expression), and there is no member number coincident with the query term number.

The decision of whether the query expression is satisfied will be described with reference to FIG. 6.

In this invention, as illustrated, the query expression specified by the user 126 is converted into members that are connected by OR condition and each of which includes query terms the number of which is stored in the query term number count table 120.

If one of the members connected by OR condition is satisfied, the whole query expression can be considered to be satisfied.

Here, each member includes a single query term or the AND of query terms.

Therefore, if all substrings coincident with the query terms included in that member appear in the text, or if the query term number previously stored in the query term number count table 120 coincides with the query term occurrence count number calculated by the query term number count program 116, that member is satisfied.

As a result, the query expression having members connected by OR condition is also satisfied.

Thus, if a query expression meets the above condition (1), it can be considered to be satisfied.

The condition (2) is the opposite to the condition (1).

If a query expression has originally a NOT condition added, and if the query expression with its NOT condition removed is satisfied, the original query expression with the NOT condition is not satisfied. If the query expression with its NOT condition removed is not satisfied, the original query expression with the NOT condition is satisfied.

If there is no member in which the query term number previously stored in the query term number count table 120 coincides with the query term occurrence count number calculated by the query term count counting program 116, the query expression with the NOT condition removed is not satisfied, but the original query expression with the NOT condition is satisfied.

Thus, if a query expression meets the condition (2), it can be considered to be satisfied.

Since a query expression which meets any one of the above conditions can be considered to be satisfied, at step 1405 the user number is supplied to the text retrieval control program 112, and this program ends.

The above operations are the process in the embodiment of the document retrieval method according to the invention.

A detailed description will be made of the process procedure of the query expression registration control program 106 in the embodiment shown in FIG. 4.

First, a description will be made of the process for the query expression analyzing program 107 at step 800 of the query expression registration control program 106 shown in FIG. 4.

The query expression analyzing program 107 is booted by the query expression registration control program 106.

For example, the query expression of user 1, ["text" and ("retrieval" or "search")], or [a text including "text" and including "retrieval" or "search"] is expanded into expression (1), the query expression of user 2, ["edit" and ¬ ("text" or "data")], or ["a text including "edit" but does not including both "text" and "data"] is expanded into expression (2), and the query expression of user 3, [ ¬ ("retrieval" and "data"), or [a text including neither "retrieval" nor "data"] is expanded into expression (3).

user 1: ["text" and ("retrieval" or "search")]→[("text" and "retrieval") or ("text" and "search")]    (1)

user 2: ["edit" and ¬ ("text" or "data")]→["edit" and (¬ "text" and ¬ "data")]→["edit" and ¬ "text" and ¬ "data"]    (2)

user 3: [ ¬ ("retrieval" and "data")]    (3)

As a result, the query expressions with no AND condition added to the outside of the OR condition, or [("text" and "retrieval") or ("text" and "search")], ["edit" and ¬ "text" and ¬ "data"], [ ¬ ("retrieval" and "data")] can be obtained.

The query terms included in these query expressions are listed as in Table 1 from the stand point of user number and member number.

TABLE 1

| USER NUMBER | MEMBER NUMBER | |
|---|---|---|
| | 1 | 2 |
| 1 | text retrieval | text search |
| 2 | edit ¬text ¬data | |
| 3 | ¬retrieval data | |

In Table 1, "¬" user number 3 indicates that a NOT condition is added to the whole query expression, and "¬" before query term indicates that a NOT condition is added to the query term.

For example, the member number 1 of the query expression of user number 1 includes two query terms of "text" and "retrieval", the member number 2 includes two query terms of "text" and "search", and the member number 1 of the query expression of user number 2 includes three query terms of "edit", "text" and "data" of which "text" and "data" have a NOT condition added.

A description will be made of the processes of the query term number count table generating program 108 at step 801 of the query expression registration control program 106 shown in FIG. 4. The query term number count table generating program 108 is booted following the query expression analyzing program 107 by the query expression registration control program 106.

This program generates the query term number count table 120 on the basis of the analyzed result from the query expression analyzing program 107.

FIG. 6 shows the query term number count table 120 produced from the analyzed result of Table 1.

This table has stored therein the number of query terms associated with each of the member numbers of each user number.

As described above, the query expression negating flag is 1 when a NOT condition is added to the whole query expression, and 0 if not so.

Finally, a description will be made of the processes of the searching automaton generation program 109 at step 802 of the query expression registration control program 106 shown in FIG. 4.

The process contents of this program were shown in FIG. 8. This program is constructed by the finite automaton generating program 110 and user list generating program 111 as shown in FIG. 2.

The processes will be mentioned in order.

The finite automaton generating program 110 generates the finite automaton 121 by which all the query terms extracted by the query expression analyzing program 107 are matched against associated substrings occurring in the text data.

For example, five query terms of "text", "retrieval", "search", "edit" and "data" can be obtained by analyzing the expressions (1), (2) and (3) and table 1 in accordance with the query expression analyzing program 107.

The finite automaton 121 for matching these query terms as shown in FIG. 9 can be generated by the method disclosed in the prior art.

The user list generating program 111 generates the user list 122 by connecting as a list the information of whether a NOT condition is added to the user numbers, member numbers and query terms of query expressions which include the query terms obtained by the query expression analyzing program 107, and connects the list through pointers to the output table of the finite automaton 121.

The method of generating this user list 122 is as described previously.

Figure 11:
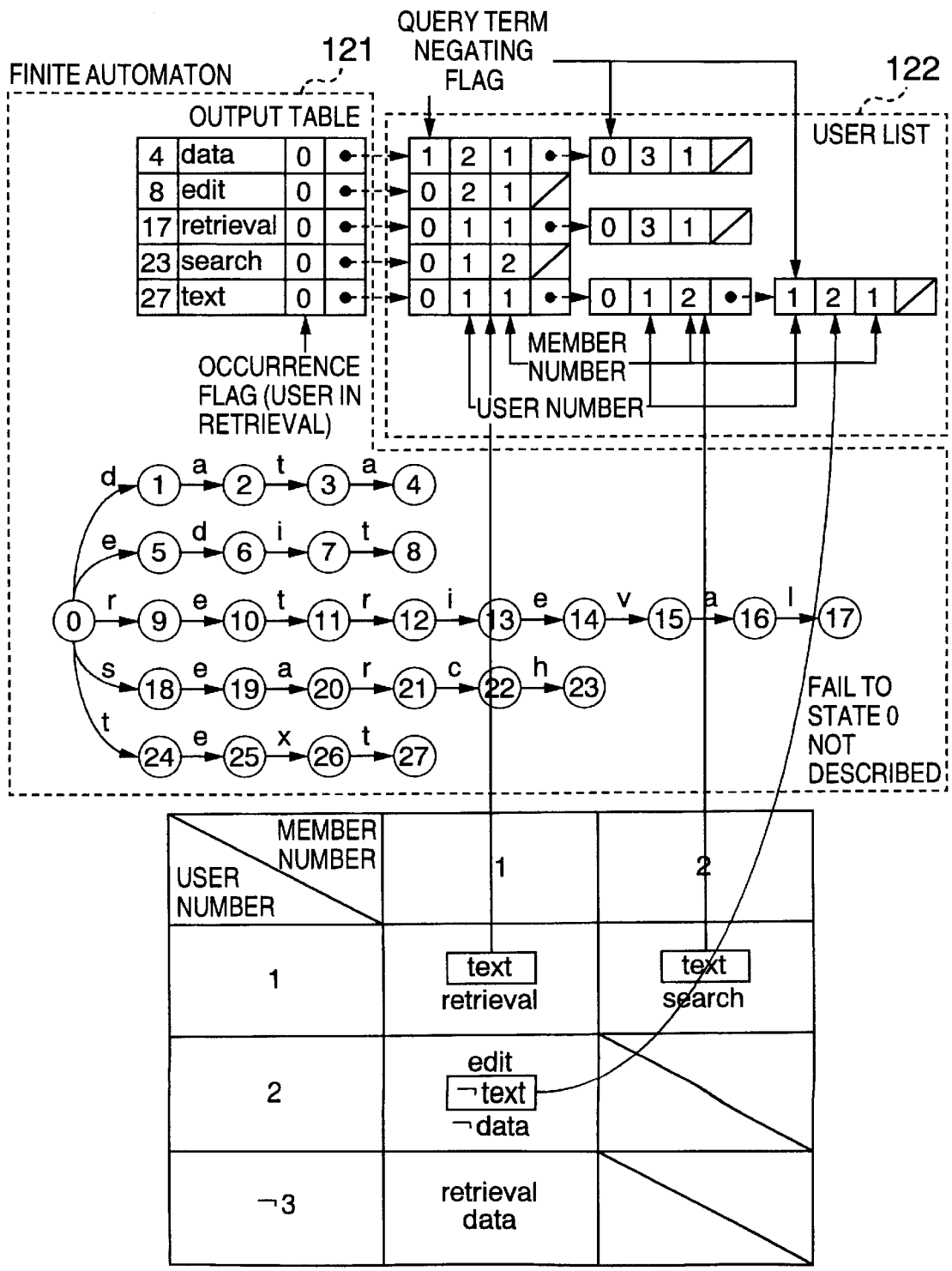
FIG. 11 is a diagram for explaining the process of producing the user list 122.

FIG. 11 shows the user list 122 generated from the analyzed results on Table 1.

For example, the query term of "data" with a NOT condition is included in the member 1 of the query expression of user number 2, and the query term of "data" with no NOT condition is included in the member 1 of the query expression of user number 3. Thus, the user list 122 is generated by connecting the numbers associated with these query terms in a form of list.

The user list 122 thus generated is connected through pointers to the output table of the finite automaton 121.

The above operations are the detailed procedure for query expression registration in the query expression registration control program 106 according to this embodiment.

Figure 7:
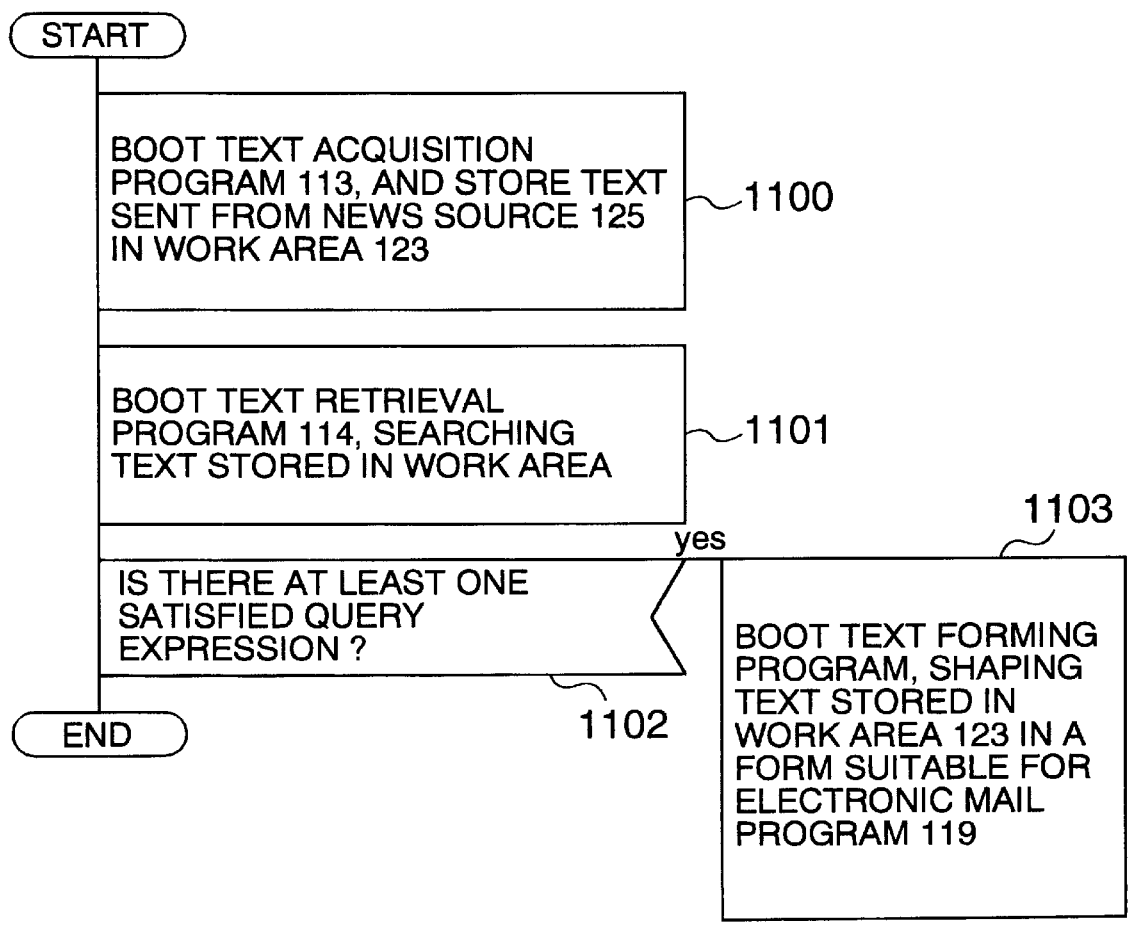
FIG. 7 is a PAD diagram showing the process contents of a text retrieval control program 112.

With reference to FIG. 7, a detailed description will be made of the process procedure in the text retrieval control program 112 according to this embodiment.

First, a description will be made of the processes of the text acquisition program 113 at step 1100 of the text retrieval control program 112 shown in FIG. 7.

The text acquisition program 113 is booted by the text retrieval control program 112.

This program makes the texts distributed by means of electronic mail be stored in the work area 123.

In the following description, it is assumed that the text of "In many information retrieval and text-editing applications it is necessary to be able to locate quickly some or all occurrences of user-specified patterns of words and phases in text" is already stored in the work area 123 by this program.

A description will be made of the processes of the text retrieval program 114 at step 1101 of the text retrieval control program 112 shown in FIG. 7.

Figure 10:
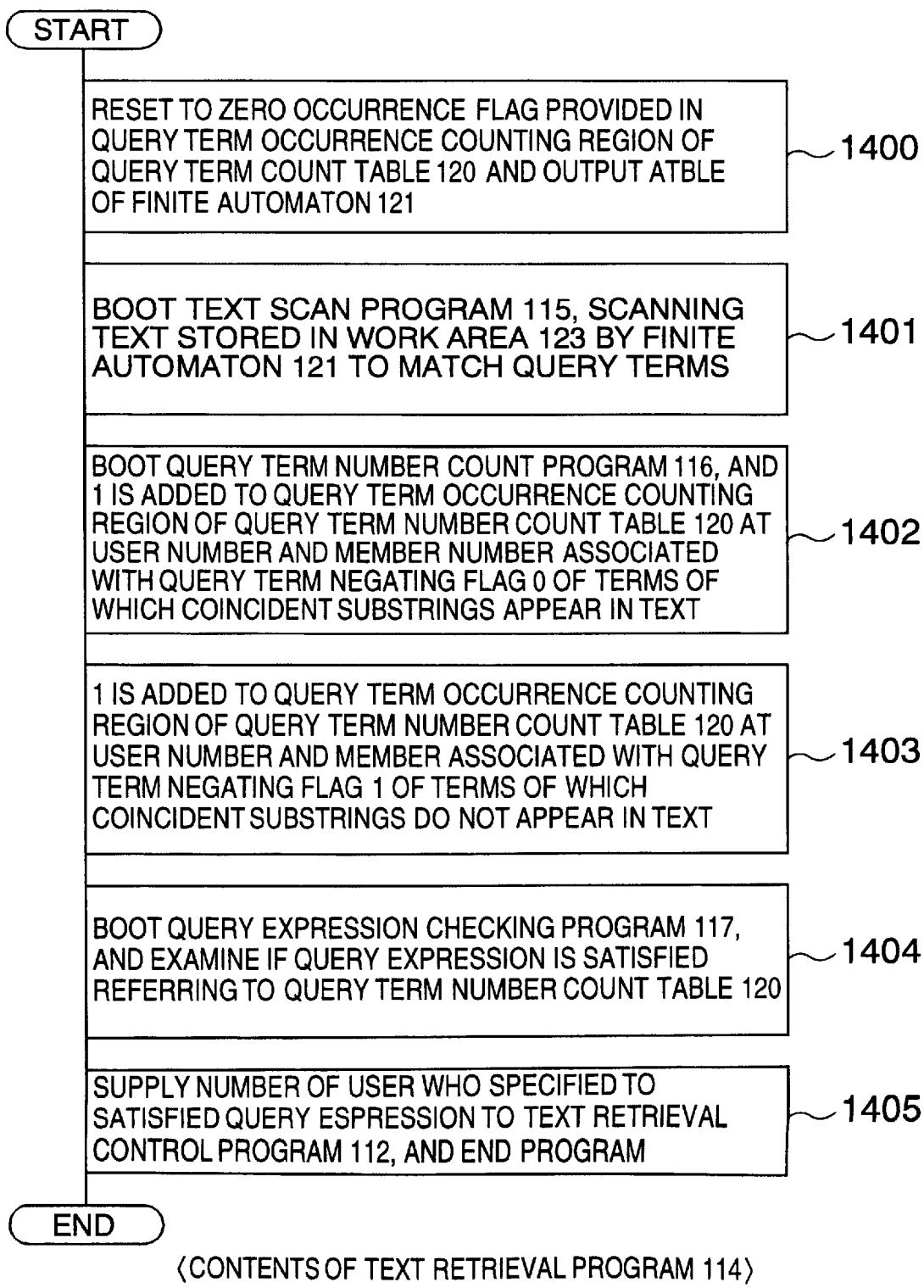
FIG. 10 is a PAD diagram showing the process contents of a text retrieval program 114.

FIG. 10 shows the process contents of this program.

Figure 2:
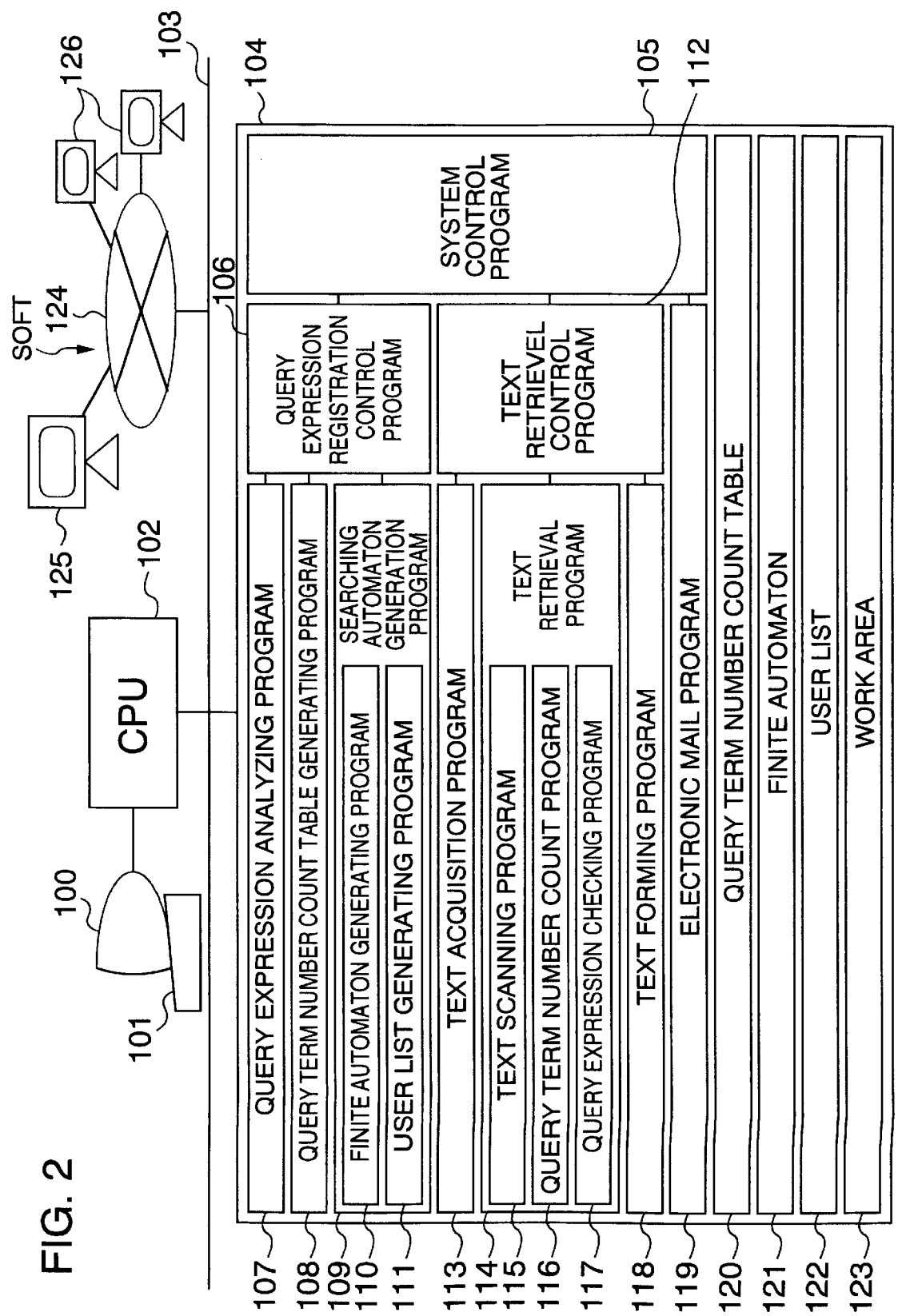
FIG. 2 is a diagram of the construction of the first embodiment of the invention.

This program is constructed by the text scanning program 115, query term number count program 116 and query expression checking program 117 as shown in FIG. 2.

These programs will be mentioned in order.

First, initial setting is made before the execution of the text scanning program 115, query term number count program 116 and query expression checking program 117.

Here, the query term occurrence number counting region of the query term number count table 120 and the occurrence flag of output table are reset to 0 as shown in FIGS. 6 and 11.

In the text scanning program 115, the finite automaton 121 scans the text stored in the work area 123, collating the substrings coincident with the query terms.

Here, the occurrence flag is set at 1 associated with the query term appearing as a substring in the text.

Figure 12:
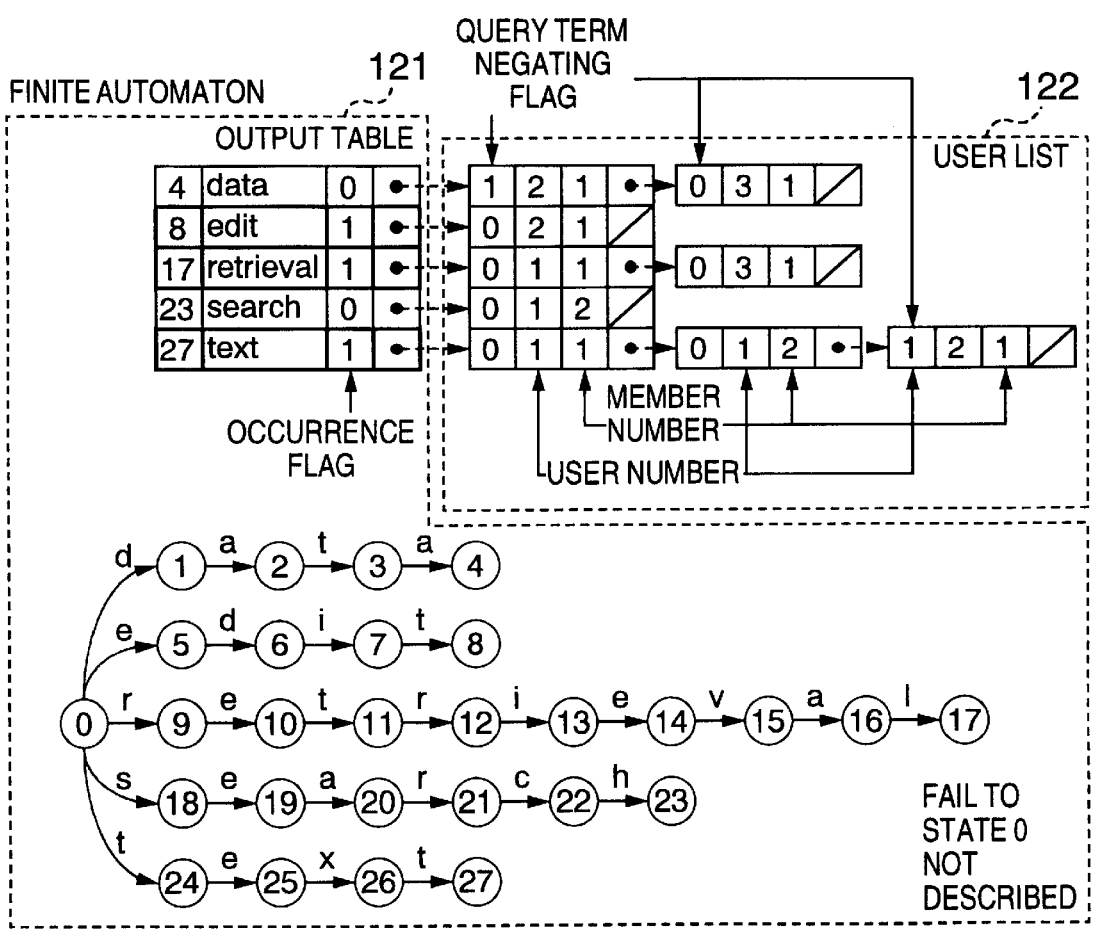
FIG. 12 is a diagram for explaining the text scanning process.

As, for example, shown in FIG. 12, when the text of "In many information retrieval and text-editing applications it is necessary to be able to locate quickly some or all occurrences of user-specified patterns of words and phases in text" is scanned, "retrieval" first appears in the text.

Thus, the occurrence flag associated with "retrieval" is set at 1.

Then, "text", "edit" and "text" appear in order, and thus the occurrence flags associated with these query terms are set at 1.

Since the query terms of "search" and "data" do not occur as corresponding substrings in the text, the occurrence flags associated with these query terms remain 0.

The query term number count program 116 first counts the query terms appearing as associated substrings in the text.

Here, 1 is added to the value in the query term occurrence number counting region of the query term number count table 120 associated with the user numbers and member numbers of which the occurrence flags are 1 as a result of appearance of the corresponding substrings in the text and of which the query term negating flags are 0, or of which the query terms have no NOT condition.

Figure 13:
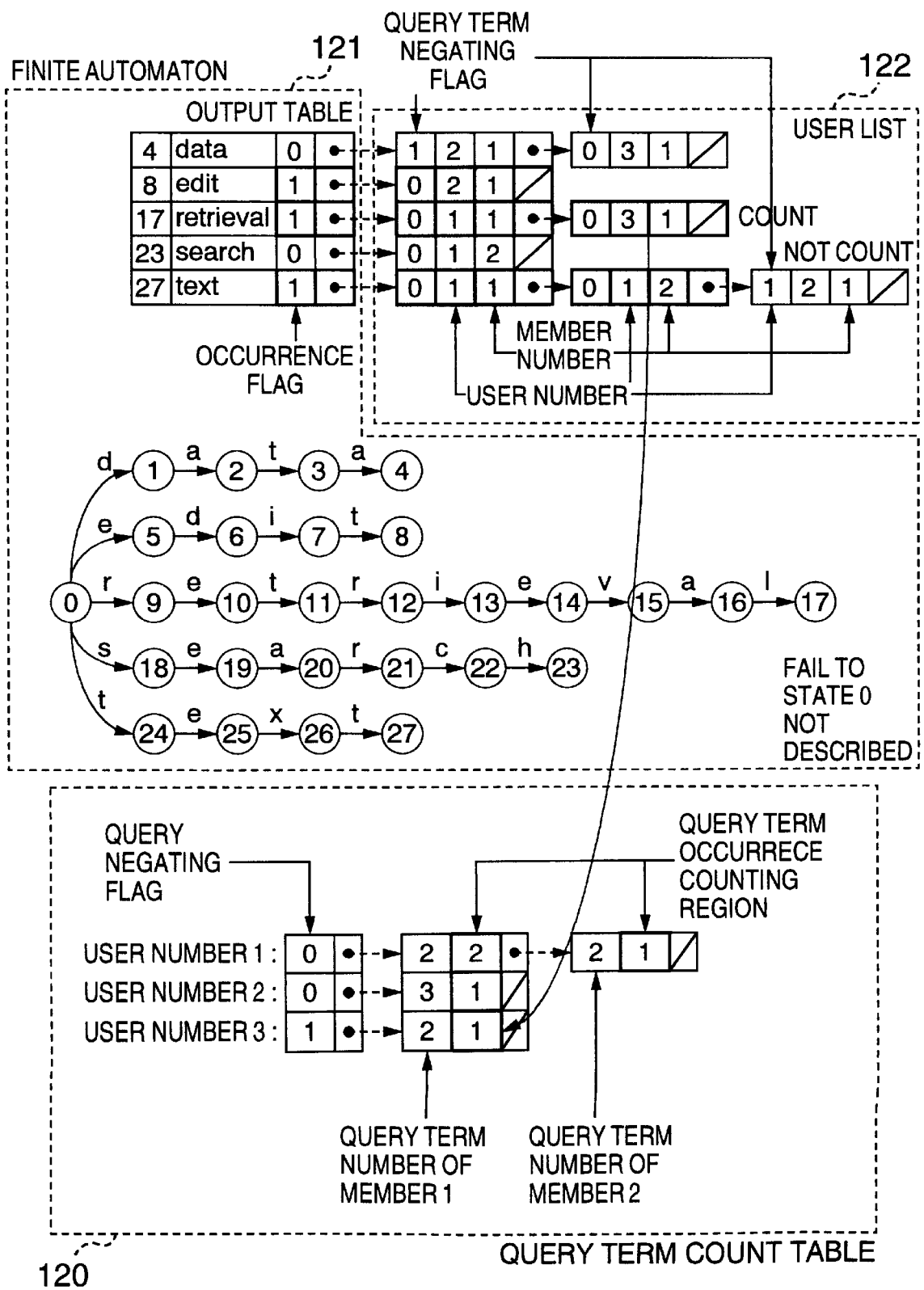
FIG. 13 is a diagram for explaining the process of counting the query term with which a substring occurring in text is associated.

As, for example, shown in FIG. 13, the query term negating flag of the member number 1 of user number 3 associated with "retrieval" is 0, thus this term being counted, but the negating flag of the member number 1 of user number 2 associated with "text" is 1, thus this term being not counted.

Then, the query terms not appearing as the corresponding substrings in the text are counted.

Here, 1 is added to the value in the query term occurrence number counting region of the query term number count table 120 associated with the user numbers and member numbers of which the occurrence flags are 0 since the corresponding substrings do not appear, and of which the query term negating flags are 1, or of which the query terms have NOT conditions.

Figure 14:
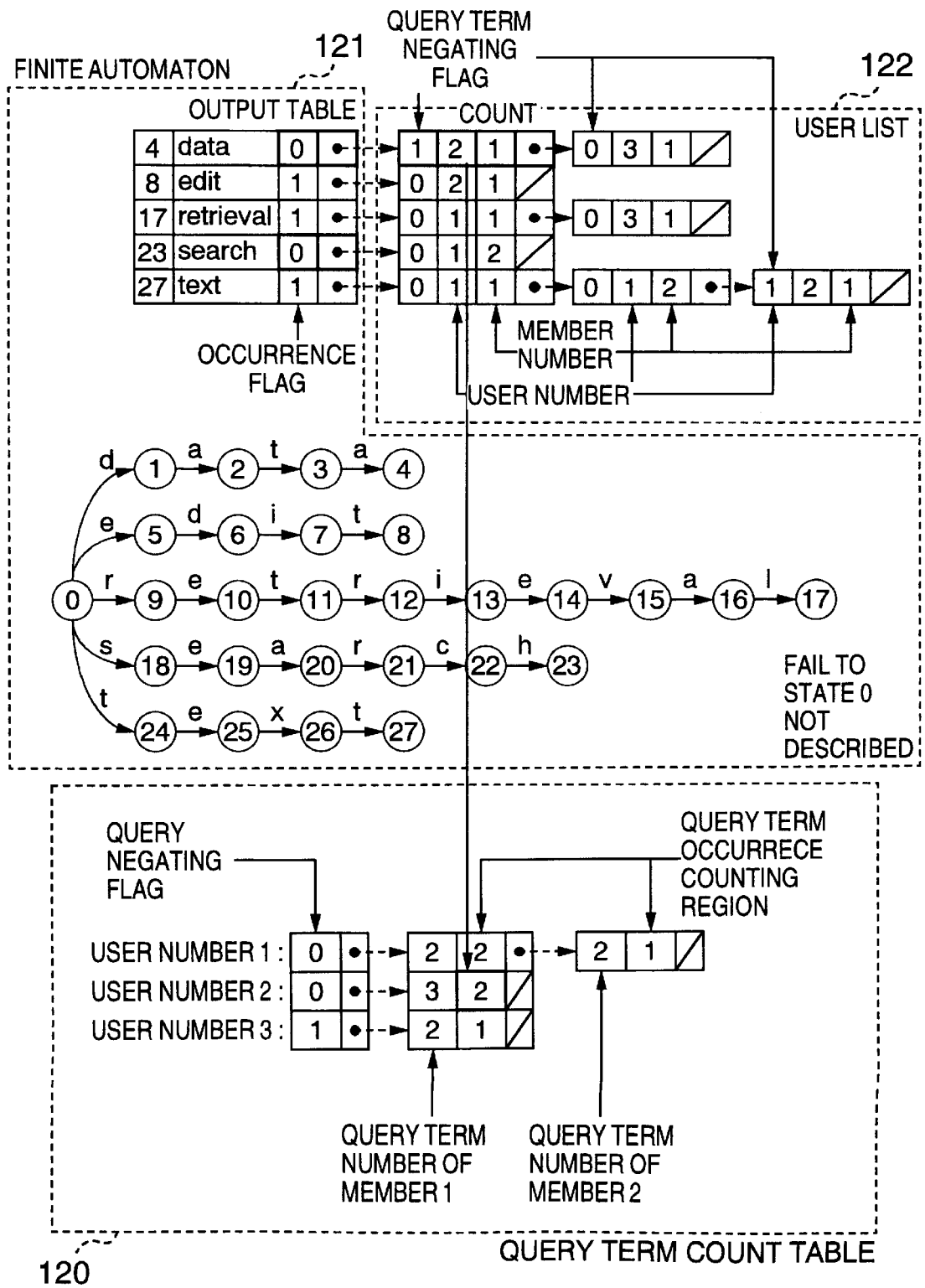
FIG. 14 is a diagram for explaining how to count the query term with which no substrings occurring in text are associated.

As, for example, shown in FIG. 14, the query term negating flag of the member number 1 of user number 2 associated with the query term of "data" is 1, thus this term being counted, but the query term negating flag of member number 1 of user number 3 associated therewith is 0, thus this query term being not counted.

The query expression checking program 117 refers to the query term number count table 120, checking if the query expression is satisfied.

Here, if the query expression meets either one of the two following conditions, it is considered to be satisfied. Thus, the program orders to produce the user number who specified the query expression.

Condition (1): the query expression negating flag is 0, or no NOT condition is added to the query expression, and there is at least one member number of which the query term number is the same as the query term occurrence count.

Condition (2): the query expression negating flag is 1, or the query expression has a NOT condition added, and there is no member number of which the query term number is the same as the query term occurrence count.

Figure 15:
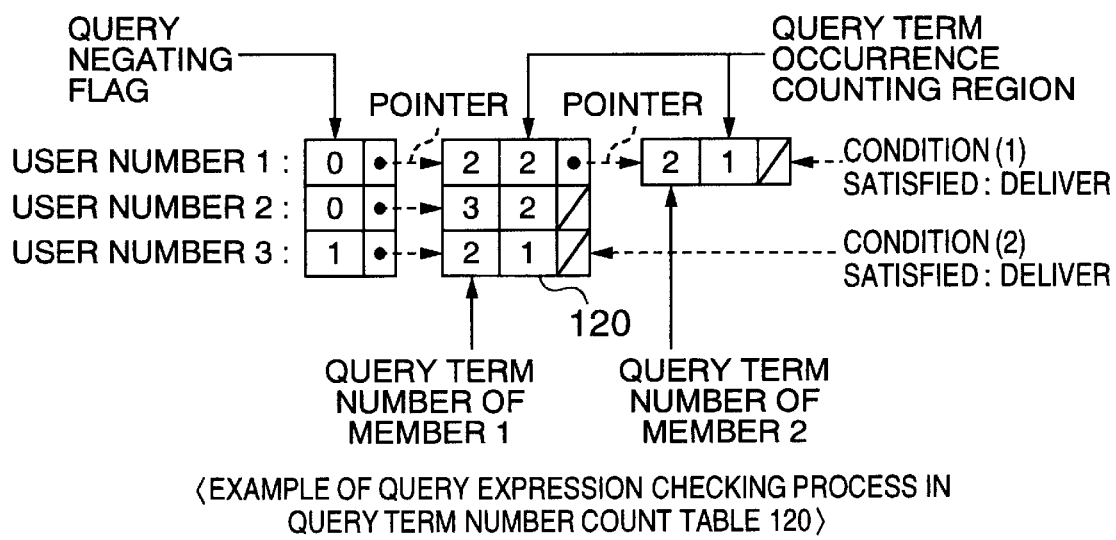
FIG. 15 is a diagram for explaining the process of checking if the query expression is satisfied.

As, for example, shown in FIG. 15, the query expression negating flag associated with user number 1 is 0, and the query term number of member number 1 coincides with the query term occurrence count. Thus, the query expression meets the above condition (1).

In addition, the query expression negating flag associated with user number 3 is 1, and there is no member number of which the query term number is not coincident with the query term occurrence count. Thus, the query expression meets the above condition (2).

However, the query expression negating flag associated with user number 2 is 0, but there is no member number of which the query term number coincides with the query term occurrence count. Thus, the query expression does not meet any one of the above conditions.

Accordingly, the query expressions of user numbers 1 and 3 are considered to be satisfied, the program orders to produce these user numbers.

Finally, a description will be made of the processes of the text forming program 118 at step 1103 of the text retrieval control program 112 shown in FIG. 7.

The text forming program 118 is booted by the text retrieval control program 112 only when the user number is produced as a result of execution of the text retrieval program 114.

This program shapes the text stored in the work area 123 into such a form that the text can be distributed according to the electronic mail program 119.

For example, control information called header is added to the head of the text.

Figure 16:
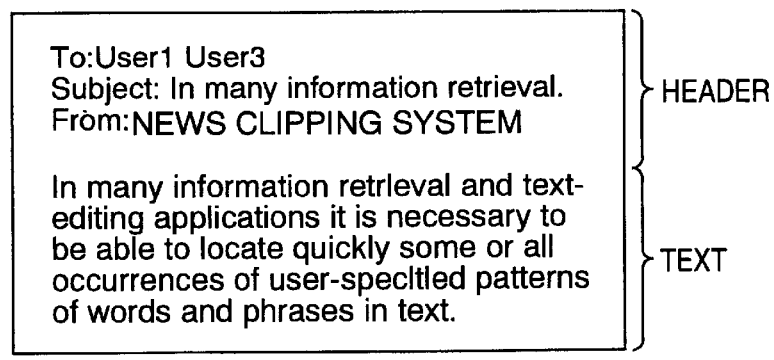
FIG. 16 is a diagram for explaining the text forming process.

FIG. 16 shows an example of the result of executing this program.

As illustrated, "To:", "Subject:" and "From:" are added as headers.

To the row of "To:" is added an address of the user to which the text is supplied by means of, for example, electronic mail.

As shown in FIG. 16, "user 1" and "user 3" are given in order that the text can be distributed to the users 1 and 3.

To the row of "Subject:" is added information which can be easily understood.

Although the first several words of the text to be distributed are given, any words may be added here.

To the row of "From:" is added an address from which the text is supplied by means of, for example, electronic mail.

Here, this source address is given as "news clipping system" as illustrated in FIG. 16.

The above-mentioned operations are the detailed procedure of the text retrieval in the text retrieval control program 112 according to this embodiment.

If there is at least one query expression satisfied as a result of executing the text retrieval control program 112, the electronic mail program 119 is booted by the system control program 105 after the end of the text retrieval control program 112 as shown in FIG. 3.

This program is executed to distribute the text by means of electronic mail with reference to the header added by the text forming program 118.

As, for example, shown in FIG. 16, the program refers to the portion corresponding to the row of the header "To:", and sends the text with the header to that address.

In this figure, since "user 1" and "user 3" are written on the row of "To:", the text is distributed to the user 1 and user 3, and the process ends.

According to the system of this invention, as described above, when a plurality of users register their query expressions, the system stores the number of the query terms included in the query expressions and specified by the users, and the identification information of the users who specified the query terms included in the query expressions. Then, when a text is searched, the number of the occurrences of the different query terms specified by each user in the text is compared with the number of query terms stored for each user, so that decision can be made of whether all the query expressions are satisfied. Thus, by scanning the text only once, it is possible to decide if all the query expressions of the users are satisfied, or the retrieval processing for all the query expressions of the users can be carried out at a time.

Accordingly, the texts acquired from a plurality of news sources can be scanned at a time on the basis of the query expressions previously registered by the users, and the query expressions of a plurality of users can be decided about whether they are satisfied or not. Then, if some query expressions are satisfied in a text, the text can be immediately distributed to the users associated with those expressions. Thus, this news clipping system can be said to be very fast in its operation.

In addition, since the operation of this news clipping system is very fast, it takes a short time for the user to supply its query expression to the system and for the associated searched texts to be fed back to the user. Also, by detecting this time, it is possible to decide if this invention is used in other systems.

Second Embodiment

The second embodiment of the invention will be described below.

The news clipping system of this embodiment manages the delivery condition for each user, thereby making it possible to simultaneously distribute a relatively large amount of text and distribute the text at a specified time in accordance with the user's demand.

In addition, if this system is used as a commercial system, texts can be distributed with a delay according to the contact conditions of users.

This embodiment has fundamentally the same construction as the first embodiment (FIG. 2), but the arrangement in the main memory 104 is different from that of the first embodiment.

Figure 17:
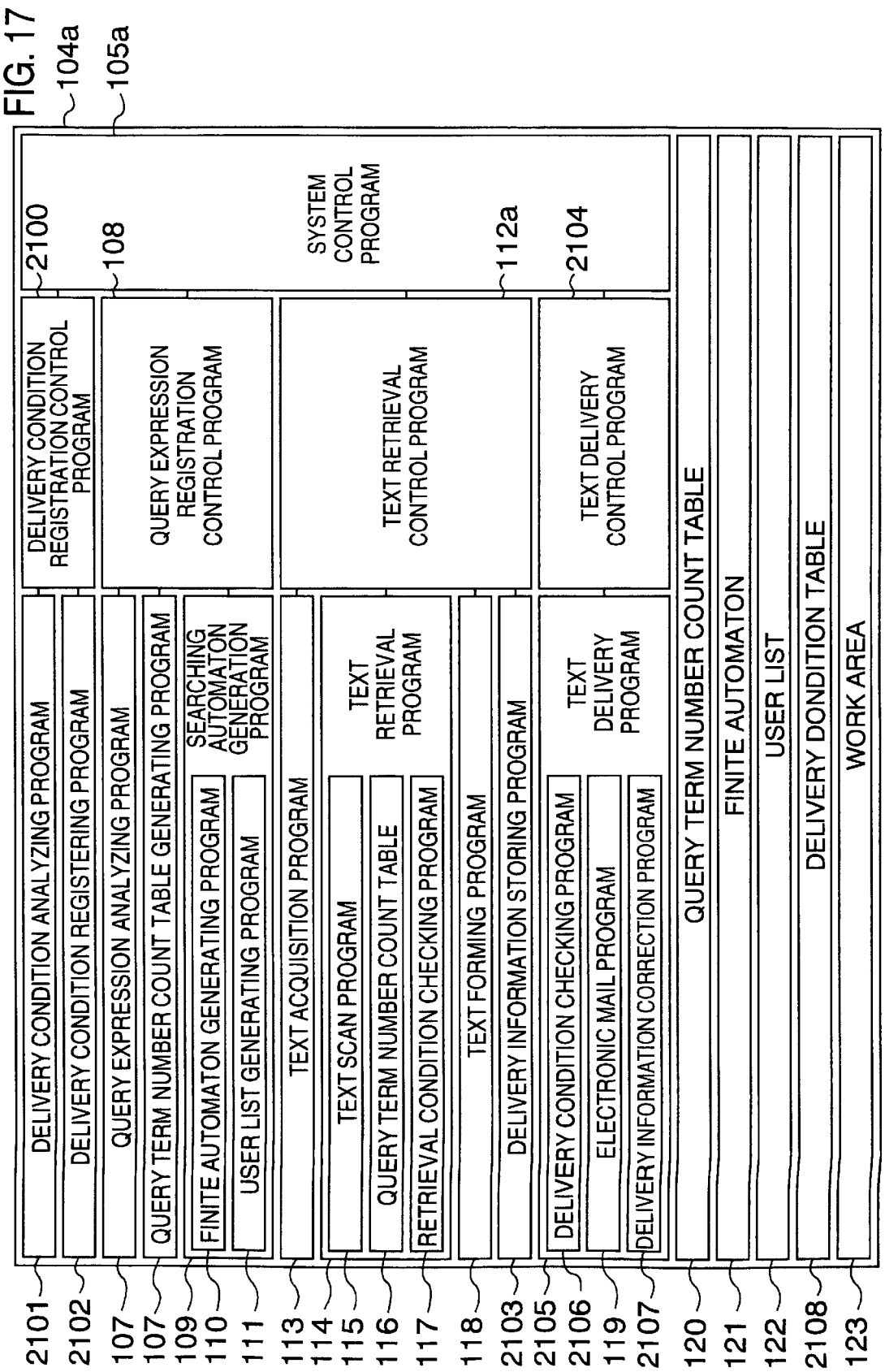
FIG. 17 is a construction diagram of the second embodiment of the invention.

FIG. 17 shows the arrangement in this main memory 104.

As illustrated in FIG. 17, a delivery condition table 2108 is provided in the main memory 104a, and a delivery condition registration control program 2100 and a text distribution control program 2104 are provided under the control of the system control program 105a.

In addition, a delivery condition analyzing program 2101 and a delivery condition registering program 2102 are provided under the delivery condition registration control program 2100, a distribution information storing program 2103 under the text retrieval control program 112a, and a text distribution program 2105 under the text distribution control program 2104.

This text distribution program 2105 is constructed by a delivery condition checking program 2106, the electronic mail program 119 and a distribution information correction program 2107.

The electronic mail program 119 is an existing mail program that is generally used in work stations.

These programs can also be stored in a recording medium capable of reading and writing on a computer, such as a hard disk apparatus, and floppy disks.

The system control program 105a is booted by the command which the operator of the news clipping system pressed on the keyboard 101.

The delivery condition registration control program 2100, query expression registration control program 106, text retrieval control program 112a and text distribution control program 2104 are booted by the system control program 105a in accordance with the delivery condition, query expression registering command from the user 126, the delivery condition registration command from the keyboard 101, and the distribution of text from the news source 125, thus controlling the delivery condition analyzing program 2101 and delivery condition registering program 2102, the query expression analyzing program 107, query term number count table generating program 108 and searching automaton generation program 109, the text acquisition program 113, text retrieval program 114, text forming program 118 and distribution information storing program 2103, and the text distribution program 2105.

A description will be made of the process contents of the news clipping system of this embodiment.

Figure 18:
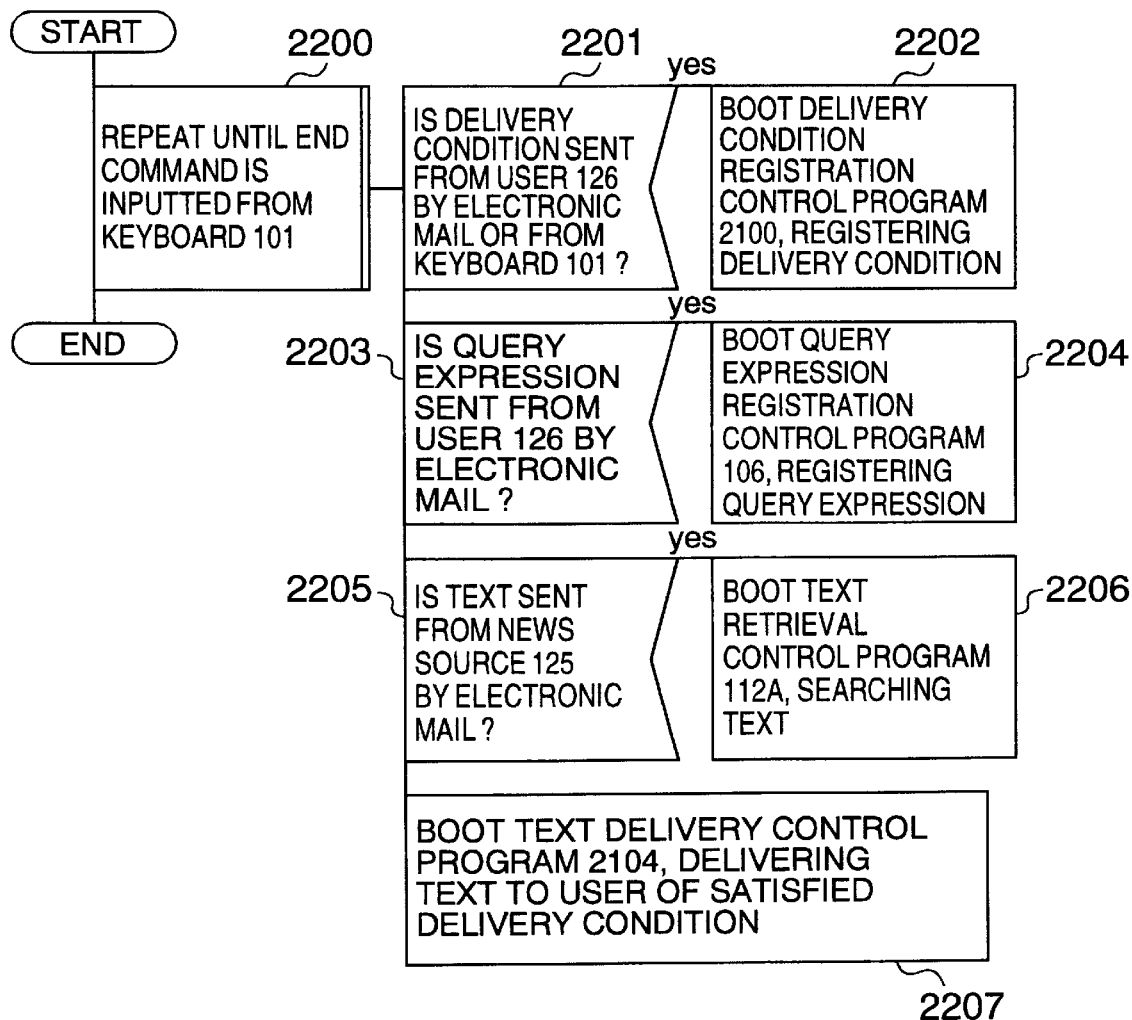

First, the process contents of the system control program 105a will be mentioned with reference to the PAD diagram of FIG. 18.

In the system control program 105a, at step 2200 the following steps are repeated until the end command is supplied from the keyboard 101.

That is, at step 2201 it is checked if an electronic mail from user 126 or a delivery condition from the keyboard 101 is transmitted.

Here, if the delivery condition is supplied, the program goes to step 2202, where the delivery condition registration control program 2100 is booted, registering the delivery condition.

Then, at step 2203 it is checked if a query expression is transmitted from user 126 by means of electronic mail.

Here, if the query expression is sent, the program goes to step 2204, where the query expression registration control program 106 is booted, registering the query expression.

Then, at step 2205 it is checked if a text is transmitted from the news source 125 by means of electronic mail.

Here, if the text is supplied, the program goes to step 2206, where the text retrieval control program 112a is booted, searching the text.

Finally, at step 2207 the text distribution control program 2104 is booted, deciding what the delivery condition needs, and distributing the text to only the user who agrees this condition.

The above operations are the process contents of the system control program 105a.

A description will be made of the process contents of the delivery condition registration control program 2100 and text distribution control program 2104 which are not provided in the first embodiment, and the text retrieval control program 112a that is different in its processing from the first embodiment.

Figure 19:
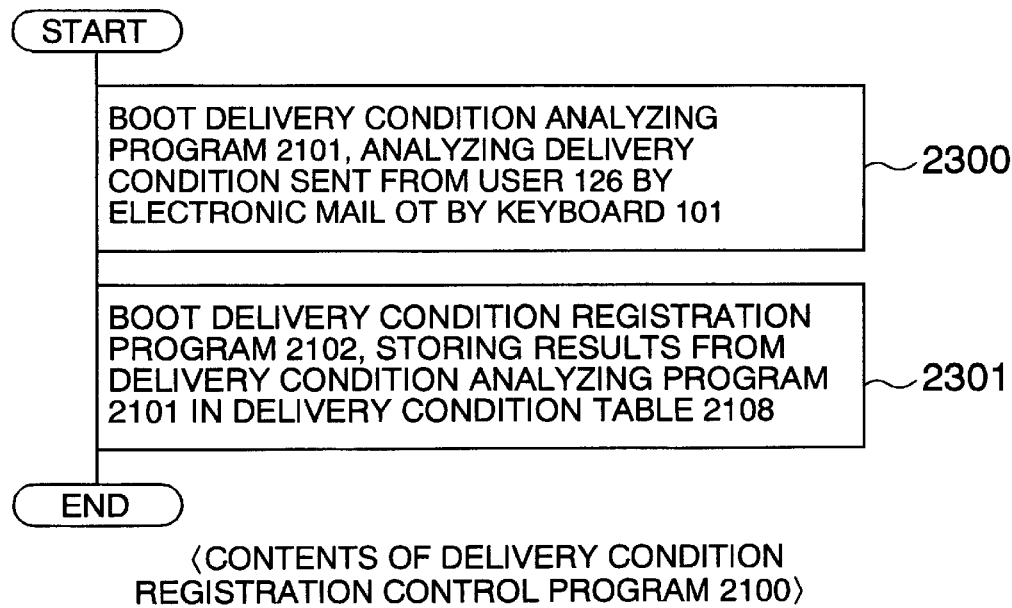
FIG. 19 is a PAD diagram showing the process contents of a delivery condition registration control program 2100.

The process contents of the delivery condition registration control program 2100 for delivery condition registration will be mentioned with reference to the PAD diagram of FIG. 19.

The delivery condition registration control program 2100 is booted by the system control program 105a.

This program boots the delivery condition analyzing program 2101 at step 2300, and analyzes the delivery condition sent from the user 126 by means of electronic mail or by pressing keys on the keyboard 101.

In this process of analyzing the delivery condition, the following information are extracted from the delivery condition.

(A) the identifiers of users who specify the delivery condition (B) the form of the delivery condition (C) the fixed value of the delivery condition The form of the delivery condition at (B) includes "distribution time", "number of items to be distributed", and "delay time".

The fixed value of the delivery condition at (C) is, for example, the time in "distribution time" at (B), the number of items in "number of items to be distributed" or the lapse time from retrieval to actual distribution in "delay time".

For example, when a delivery condition of

User number 1: distribution time (18:00) is transmitted which means that "an item is distributed to user number 1 at 18:00", "user number 1", "distribution time" and "18:00" are extracted from the delivery condition.

When a delivery condition of

User number 2: the number of items (5) to be distributed which means that "each collection of five items is distributed at a time to user number 2", "user number 2", "distribution items" and "5" are extracted from the condition.

When a delivery condition of

User number 3: delay time (01:30) which means that "texts are distributed with a delay of one hour and 30 minutes to the user number 3", "user number 3", "delay time" and "01:30" are extracted from the condition.

Finally, at step 2301 the delivery condition registering program 2102 is booted, making the analyzed result from the delivery condition analyzing program 2101 be stored in the delivery condition table 2108.

Figure 20:
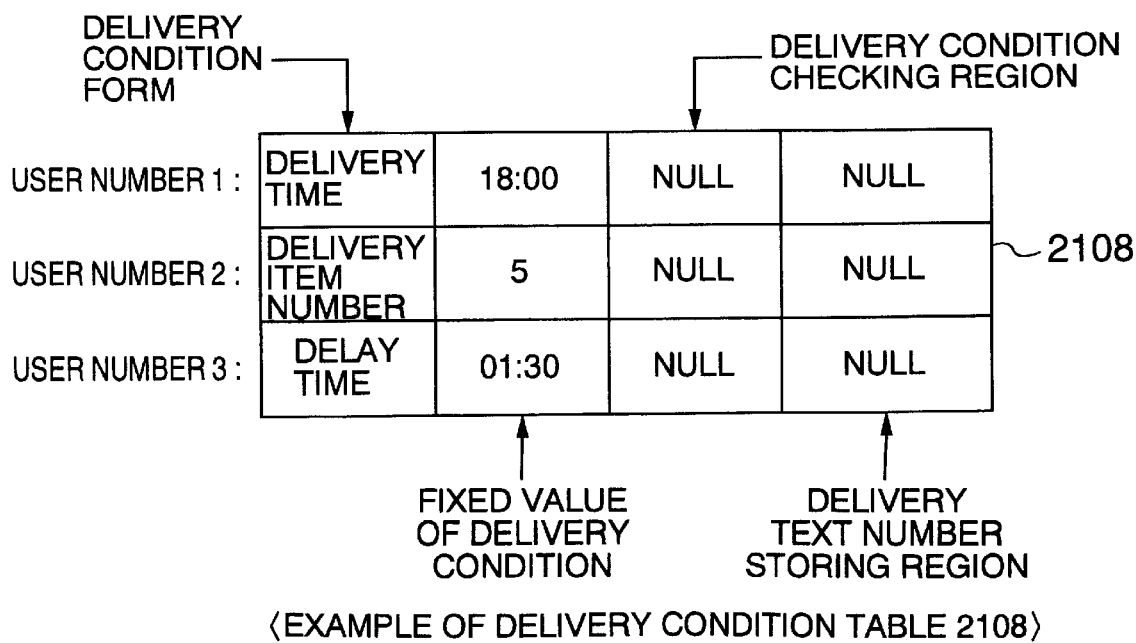
FIG. 20 is a diagram of the construction of a delivery management table 2108.

FIG. 20 shows an example of the delivery condition table 2108.

The delivery condition table 2108 has stored therein the forms and fixed values of delivery condition to be associated with each user number, which are extracted by the delivery condition analyzing program 2101. In addition, in this table, there are provided the delivery condition checking region and distribution text number storing region.

The process contents of the text retrieval according to the text retrieval control program 112a will be described with reference to the PAD diagram of FIG. 21.

The text retrieval control program 112a is booted by the system control program 105a.

Figure 21:
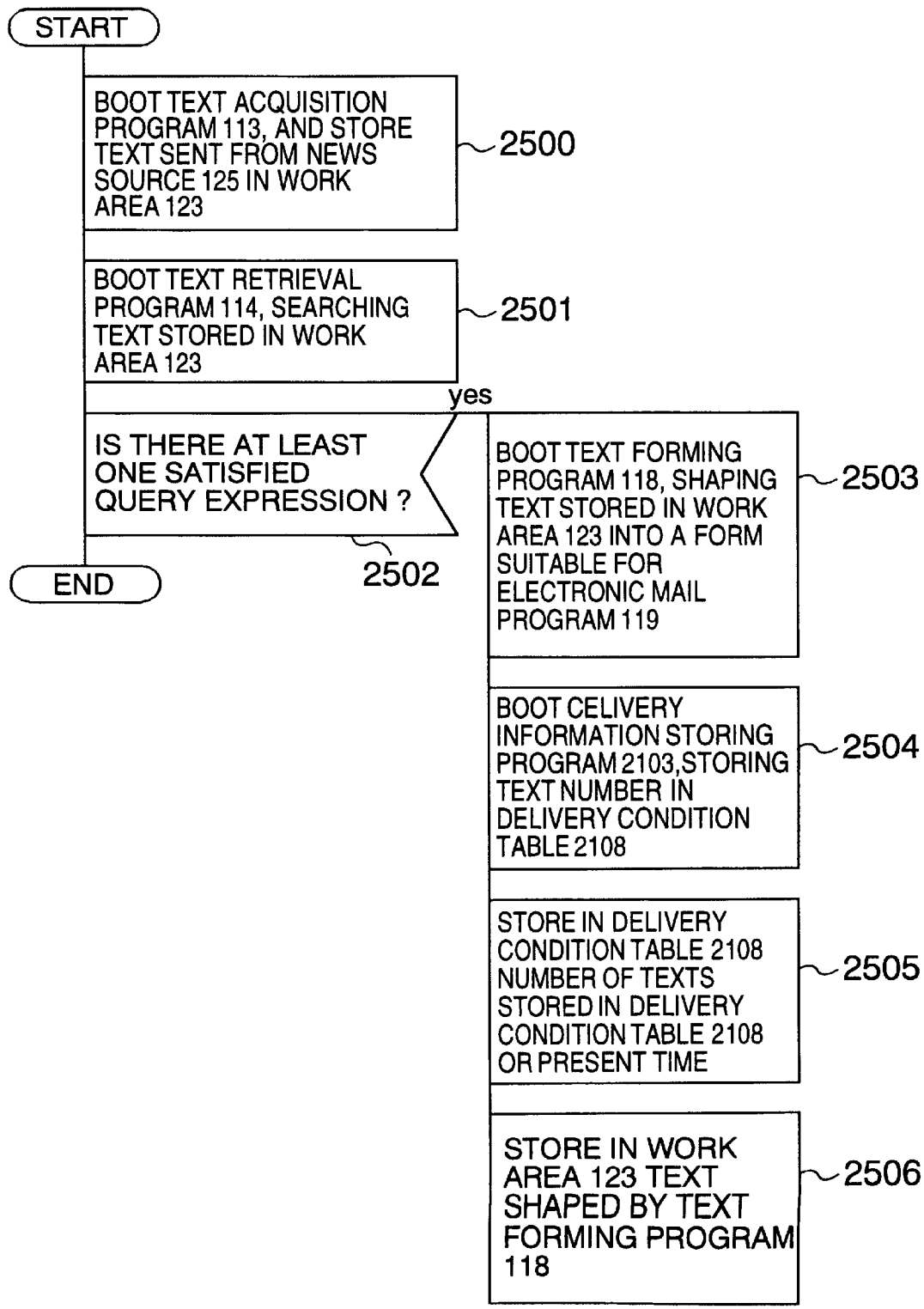

Of the process contents of this program shown in FIG. 21, the text acquisition program 113, text retrieval program 114 and text forming program 118 at steps 2500 to 2503 are the same as mentioned about the first embodiment.

The text retrieval control program 112a boots the distribution information storing program 2103 at step 2504, so that the number of the text to be distributed, of which the query expression is satisfied can be additionally stored in the distribution text number storing region.

Then, at step 2505 the text number stored in the distribution text number storing region of the delivery condition table 2108 or the present time is stored in the delivery condition checking region of this table.

At this time, the text number is stored when the form of delivery condition is "number of items to be distributed", and the present time is stored when the form of delivery condition is "delay time". When the form is "distribution time", nothing is stored.

Then, at step 2506 the text formed by the text forming program 118 is stored in the work area 123.

Figure 22:
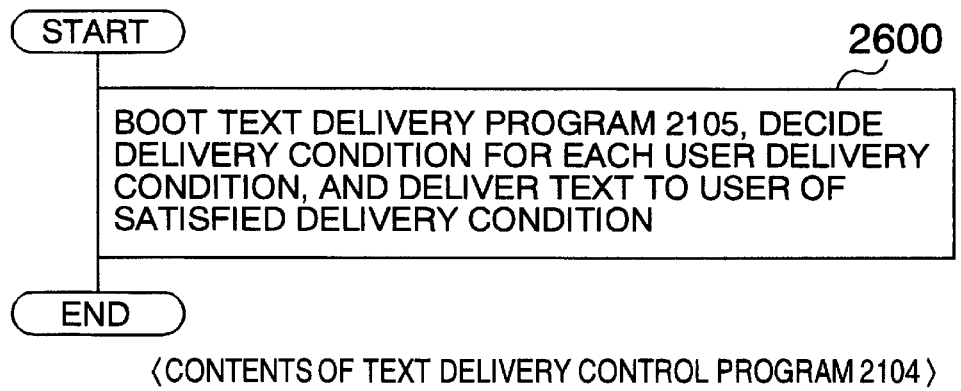
FIG. 22 is a PAD diagram showing the process contents of a text delivery control program 2104.

Finally, the process contents of the text distribution according to the text distribution control program 2104 will be described with reference to the PAD diagram of FIG. 22.

The text distribution control program 2104 is booted by the system control program 105a.

This program boots the text distribution program 2105 at step 2600, deciding the delivery condition of each user, and distributing text to the user of the satisfied condition.

Figure 23:
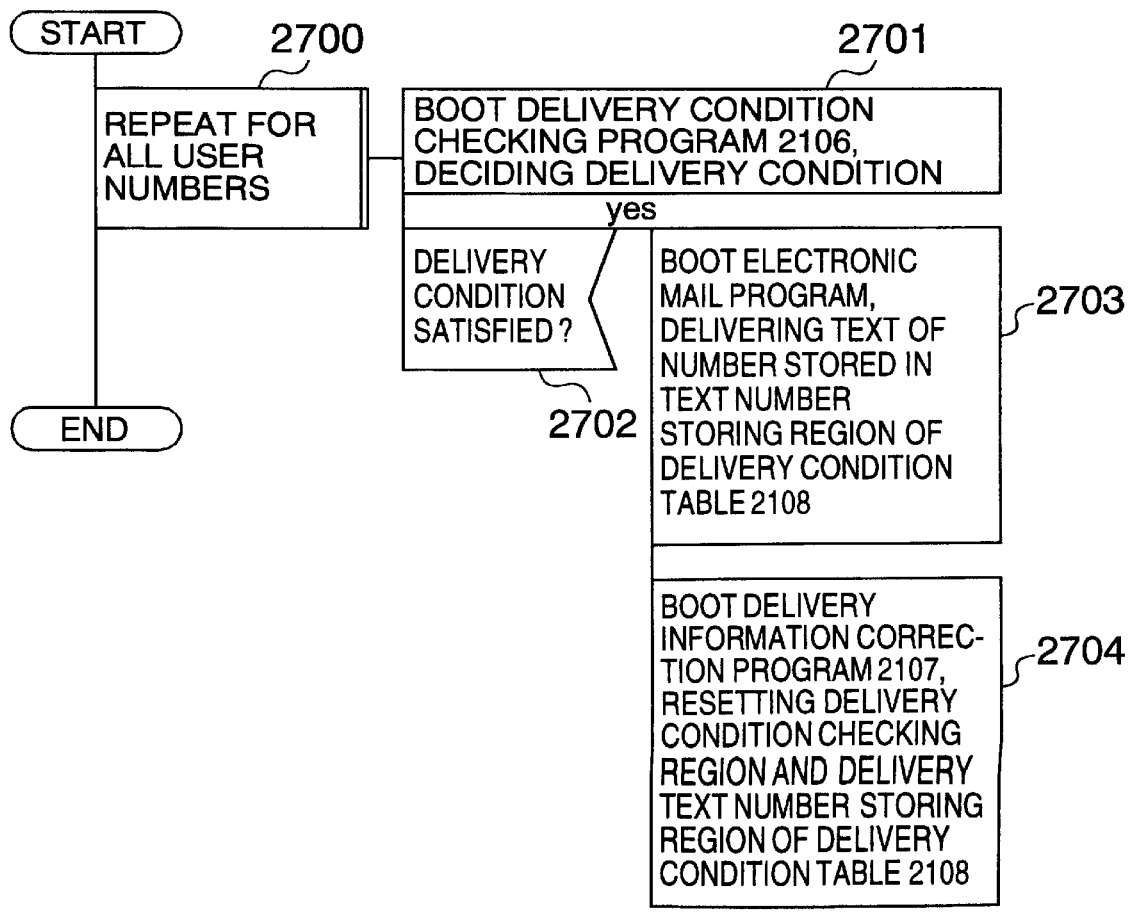
FIG. 23 is a PAD diagram showing the process contents of a text delivery program 2105.

FIG. 23 shows detailed contents of the text distribution program 2105.

In the text distribution program 2105, at step 2700 the following steps are repeatedly executed for all user numbers of which the delivery conditions are stored in the delivery condition table 2108.

That is, at step 2701 the delivery condition checking program 2106 is booted, deciding if the delivery condition is satisfied by use of the delivery condition table 2108.

Here, if the following conditions are fulfilled, the delivery condition is considered to be satisfied.

Condition (1): the form of delivery condition is "distribution time", and the fixed value of delivery condition coincides with the present time or is smaller than that.

Condition (2): the form of delivery condition is "number of items to be distributed", and the fixed value of delivery condition coincides with the item number stored in the delivery condition checking region.

Condition (3): the form of delivery condition is "delay time", and the fixed value of delivery condition coincides with the lapse time from the time stored in the delivery condition checking region to the present time or smaller than that.

If the above conditions are satisfied, at step 2702 it is decided that the delivery conditions are satisfied. At step 2703 the electronic mail program 119 is booted, distributing to the user number the text of the number stored in the distribution text number storing region of the delivery condition table 2108.

Finally, at step 2704 the distribution information correction program 2107 is booted, resetting the delivery condition checking region and distribution text number storing region of the delivery condition table 2108, corresponding to the user number to which text was distributed.

This is achieved by nulling, or clearing the delivery condition checking region and eliminating the text number from the distribution text number storing region.

The above operations are those according to the embodiment of the news clipping system of the invention.

Figure 24:
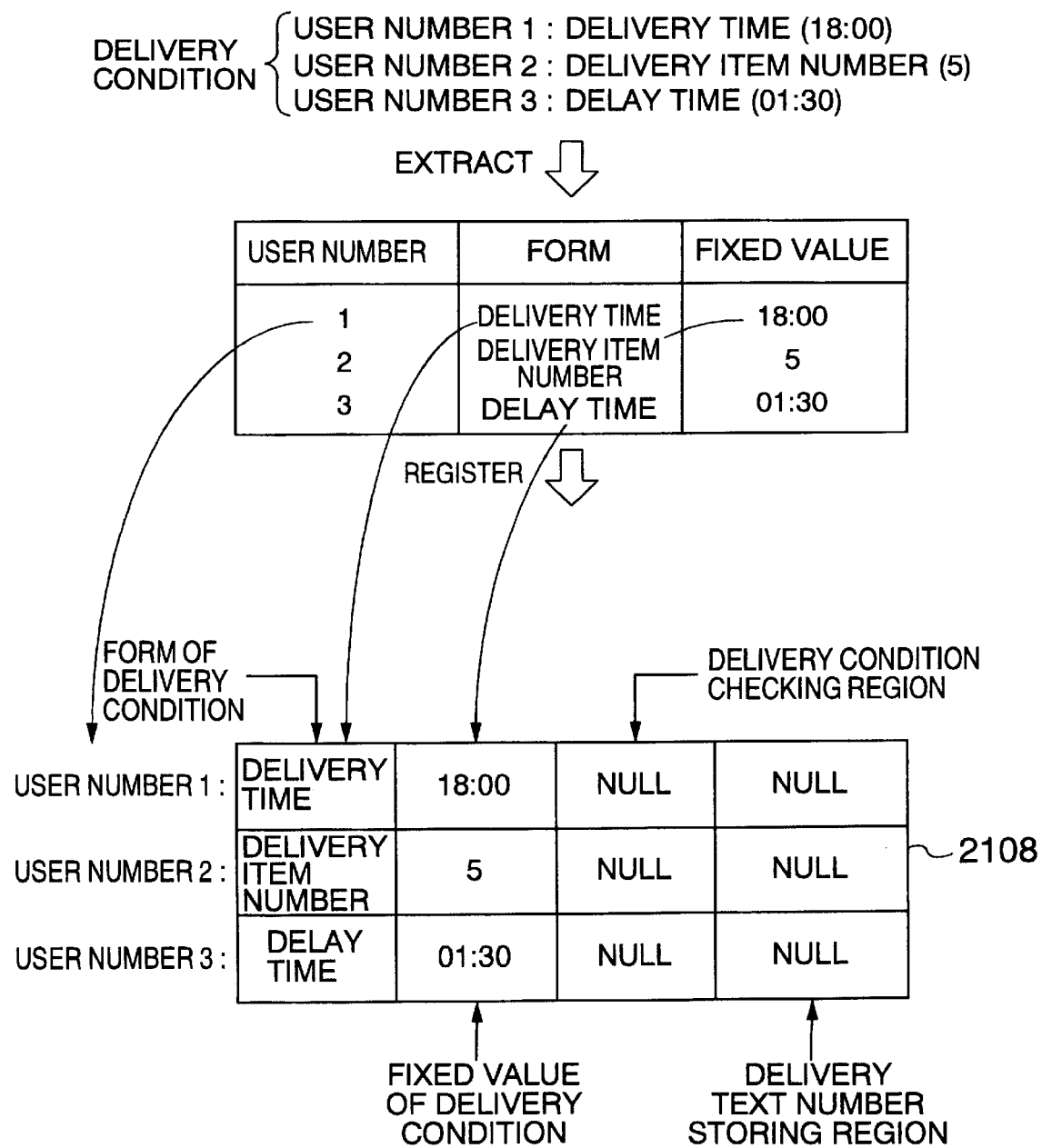
FIG. 24 is a diagram for explaining the delivery condition registration process.

With reference to FIG. 24, a detailed description will be made of the process procedure of the delivery condition registration control program 2100 in this embodiment shown in FIG. 19.

First, a description will be made of the processes of the delivery condition analyzing program 2101 at step 2300 of the delivery condition registration control program 2100.

The delivery condition analyzing program 2101 is booted by the delivery condition registration control program 2100.

This program analyzes the delivery condition sent from the user 126 by means of electronic mail or the delivery condition obtained by pressing keys on the keyboard 101.

FIG. 24 shows an example of the results of analyzing the delivery conditions of "user number 1: distribution time (18:00)", "user number 2: distribution item number (5)" and "user number 3: delay time (01:30)".

If the delivery condition is "user number 1: distribution time (18:00)", the analyzed results are the user number "1" which specifies the distribution condition, the form "distribution time" of delivery condition and the fixe value "18:00" of delivery condition.

A description will be made of the processes of the delivery condition registering program 2102 at step 2301 of the delivery condition registration control program 2100 shown in FIG. 19.

The delivery condition registering program 2102 is booted following the delivery condition analyzing program 2101 by the delivery condition registration control program 2100.

This program generates the delivery condition table 2108 on the basis of the analyzed results from the delivery condition analyzing program 2101.

FIG. 24 shows an example of the generated delivery condition table 2108.

In this table there are stored the forms and fixed values of the delivery condition for each user on the basis of the analyzed results from the delivery condition analyzing program 2101. Also, this table has provided therein the delivery condition checking region and distribution text number storing region.

The above operations are a detailed procedure of the query expression registration processes of the distribution condition registration control program 2100 in this embodiment.

A detailed description will be made of the process procedure of the text retrieval control program 112a in this embodiment shown in FIG. 21.

Of this program shown in FIG. 21, the process contents of the text acquisition program 113, text retrieval program 114 and text forming program 118 at steps 2500 to 2503 are the same as those mentioned about the first embodiment.

The distribution information storing program 2103 at steps 2504 to 2506 will be described below in detail.

The distribution information storing program 2103 is booted following the text forming program 118 by the text retrieval control program 112a.

In this program, at step 2504 the text number is stored in the distribution text number storing region of the delivery condition table 2108 corresponding to the user number associated with the satisfied query expression.

Figure 25:
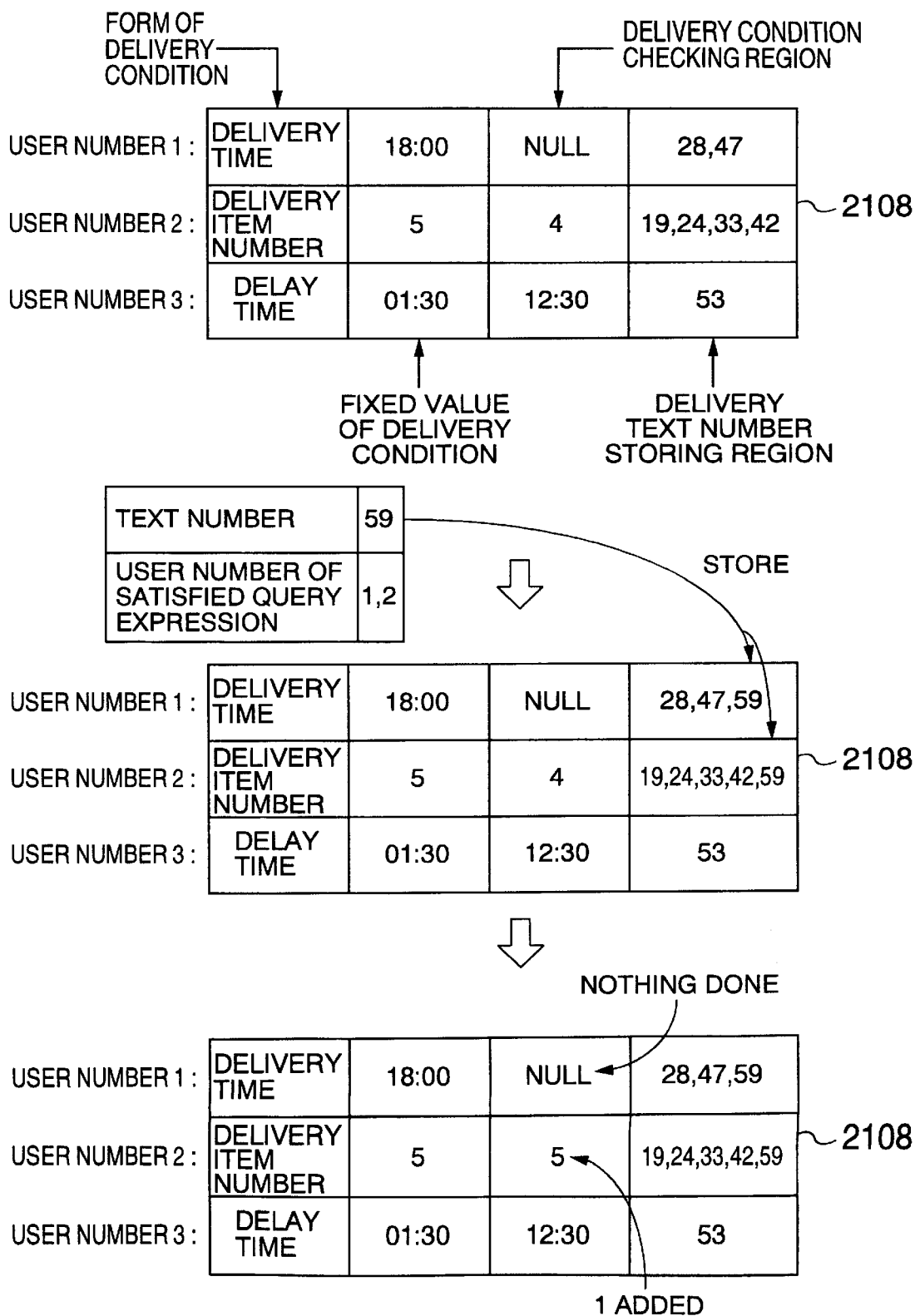
FIG. 25 is a diagram for explaining the delivery information storage process.

FIG. 25 shows an example of the process contents of this program.

As illustrated, the query expressions of user number 1 and user number 2 are satisfied to the text number 59.

Thus, the text number 59 is stored in the distribution text number storing regions of the delivery condition table 2108 corresponding to user number 1 and user number 2.

Then, in the distribution information storing program 2103, at step 2504 the text numbers stored in the distribution text number storing regions of the delivery condition table 2108 or the present time are stored in the delivery condition checking regions of the delivery condition table 2108.

At this time, the stored text numbers are stored when the form of delivery condition is "number of items to be distributed" or the present time is stored when it is "delay time". When it is "distribution time", nothing is stored.

In the example of FIG. 25, since the form of delivery condition of user number 2 is "number of items to be distributed", 1 is added to the value in the delivery condition checking region, making it "5". However, since the form of delivery condition of user number 1 is "distribution time", nothing is done.

Finally, the distribution information storing program 2103 makes the text formed by the text forming program 118 be stored in the work area 123 at step 2506, and ends.

Finally, a description will be made of the processes of the text distribution program 2105 at step 2600 of the text distribution control program 2104 shown in FIG. 22. The text distribution program 2105 is explained in detail in FIG. 23.

At step 2700 the following steps are repeatedly executed for all users of which the distribution conditions are stored in the delivery condition table 2108.

That is, step 2701 the delivery condition checking program 2105 is booted, deciding the delivery conditions.

Here, if the following conditions are fulfilled, the corresponding delivery condition is considered to be satisfied.

Condition (1): the form of delivery condition is "distribution time", and the fixed value of delivery condition coincides the present time or smaller than that.

Condition (2): the form of delivery condition is "number of items to be distributed", and the fixed value of delivery condition coincides with the number of items stored in the delivery condition checking region.

Condition (3): the form of delivery condition is "delay time", and the fixe value of delivery condition coincides with the lapse time from the time stored in the delivery condition checking region to the present time or smaller than that.

The form of the delivery condition corresponding to user number 1 is "distribution time".

However, since the present time "14:00" is not larger than the fixe value "18:00" of delivery condition, the delivery condition is satisfied. Thus, the program goes to the following step in the repeating process.

Since the form of delivery condition corresponding to user number 2 is "number of items to be distributed", and since the fixed value "5" of delivery condition coincides with the number of items stored in the delivery condition checking region, the program goes to step 2703, where the electronic mail program 119 is booted, distributing the text of the number stored in the distribution text number storing region of the delivery condition table 2108.

In this figure, since the text numbers 19, 24, 33, 42, 49 are stored in the distribution text number storing region corresponding to the user number 2, the texts stored in the work area 123 and corresponding to those text numbers are distributed to the user number 2.

Then, at step 2704 the distribution information correction program 2107 is booted, resetting the distribution checking region and distribution text number storing region of the delivery condition table 2108 corresponding to the text-distributed user number, or user number 2, and the program goes to the next step in the repeating process.

Since the form of delivery condition corresponding to user number 3 is "delay time", and since the time "01:30" stored as the fixe value of delivery condition coincides with the lapse time from the time stored in the delivery condition checking region to the present time, the program goes to step 2703, where the electronic mail program 119 is booted, distributing the text of the number stored in the distribution text number storing region of the delivery condition table 2108.

In this figure, since the text number 53 is stored in the distribution text number storing region corresponding to user number 3, the program distributes to the user number 3 the text stored in the work area 123 and corresponding to that text number.

Then, at step 2704 the distribution information correction program 2107 is booted, resetting the distribution checking region and distribution text number storing region of the delivery condition table 2108 corresponding to the text-distributed user number, or user number 2.

Figure 26:
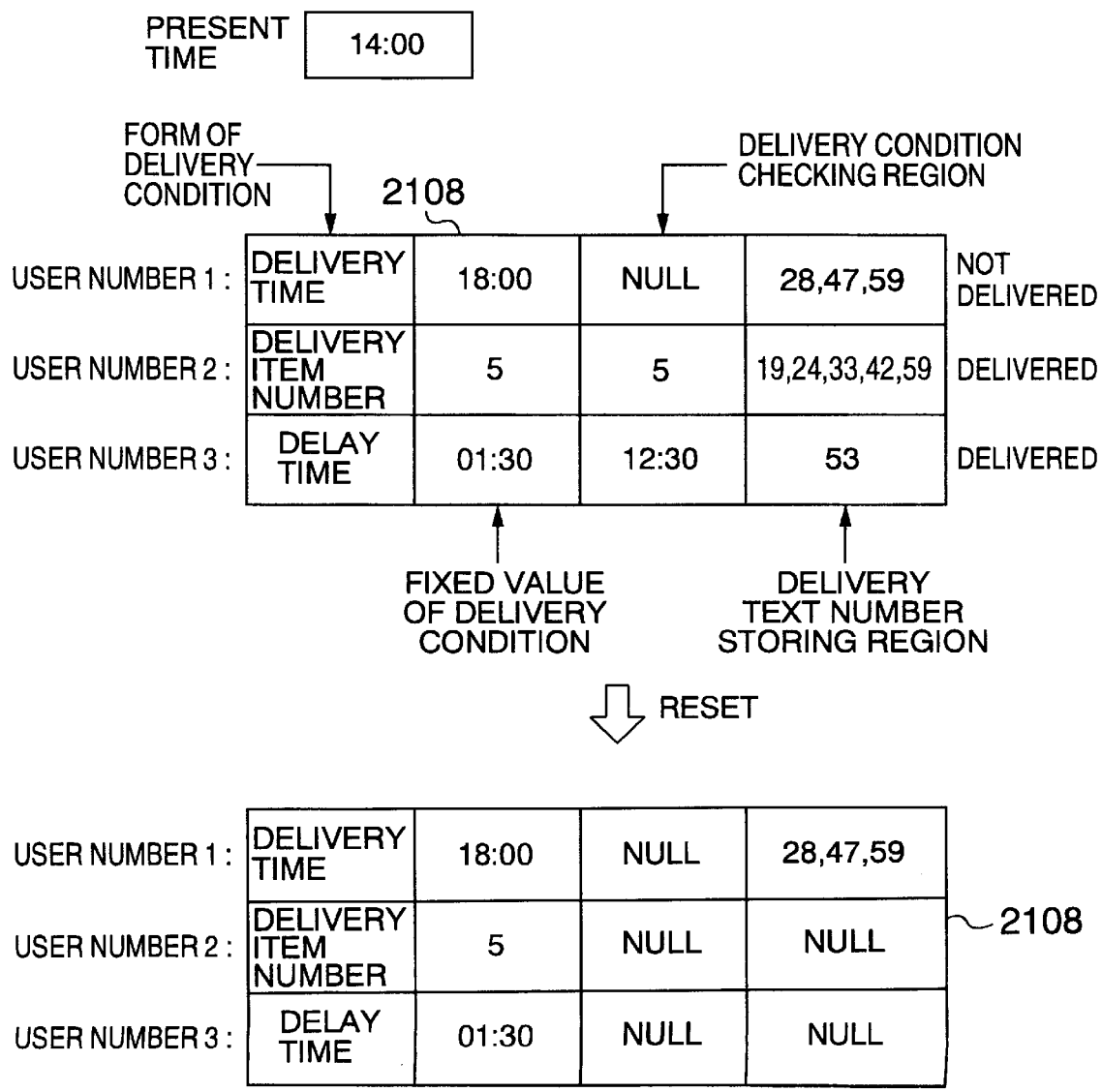
FIG. 26 is a diagram for explaining the delivery condition checking process and delivery information correcting process.

FIG. 26 shows the delivery condition table 2108 in the state in which all the repeating processes have completed.

Since the texts have been distributed to the user number 2 and user number 3, the program resets the delivery condition checking region and distribution text number storing region corresponding to those.

According to the invention, as described above, since a delivery condition is established for each user, and since the text of which the query expression is satisfied is distributed in accordance with the delivery condition, text can be distributed as the user desires, such as by distributing a certain collection of texts at a time or by distributing text at a specified time.

In addition, when the system is commercially used, text can be distributed with a delay time in accordance with the contact conditions of users.

As a result, since the texts acquired from a plurality of news sources can be scanned only once on the basis of the query expressions previously registered by users, and since it can be decided if the query expressions of a plurality of users are satisfied in the single scanning operation, the searched texts can be distributed according to the delivery conditions which the individual users desire. Therefore, the news clipping system of this embodiment can be said to be very flexible.

Third Embodiment

The third embodiment of the invention will be described.

The news clipping system of this embodiment manages the query terms included in the query expression specified by each user, and when the user orders to eliminate the query expression, easily eliminate previous information from the user list by searching the finite automaton on the basis of the managed query terms and changing the pointers of the user list.

According to this embodiment, the query expression can be easily changed by the user.

This embodiment has fundamentally the same construction as the first embodiment (FIG. 2), but is different in the arrangement in the main memory 104.

Figure 27:
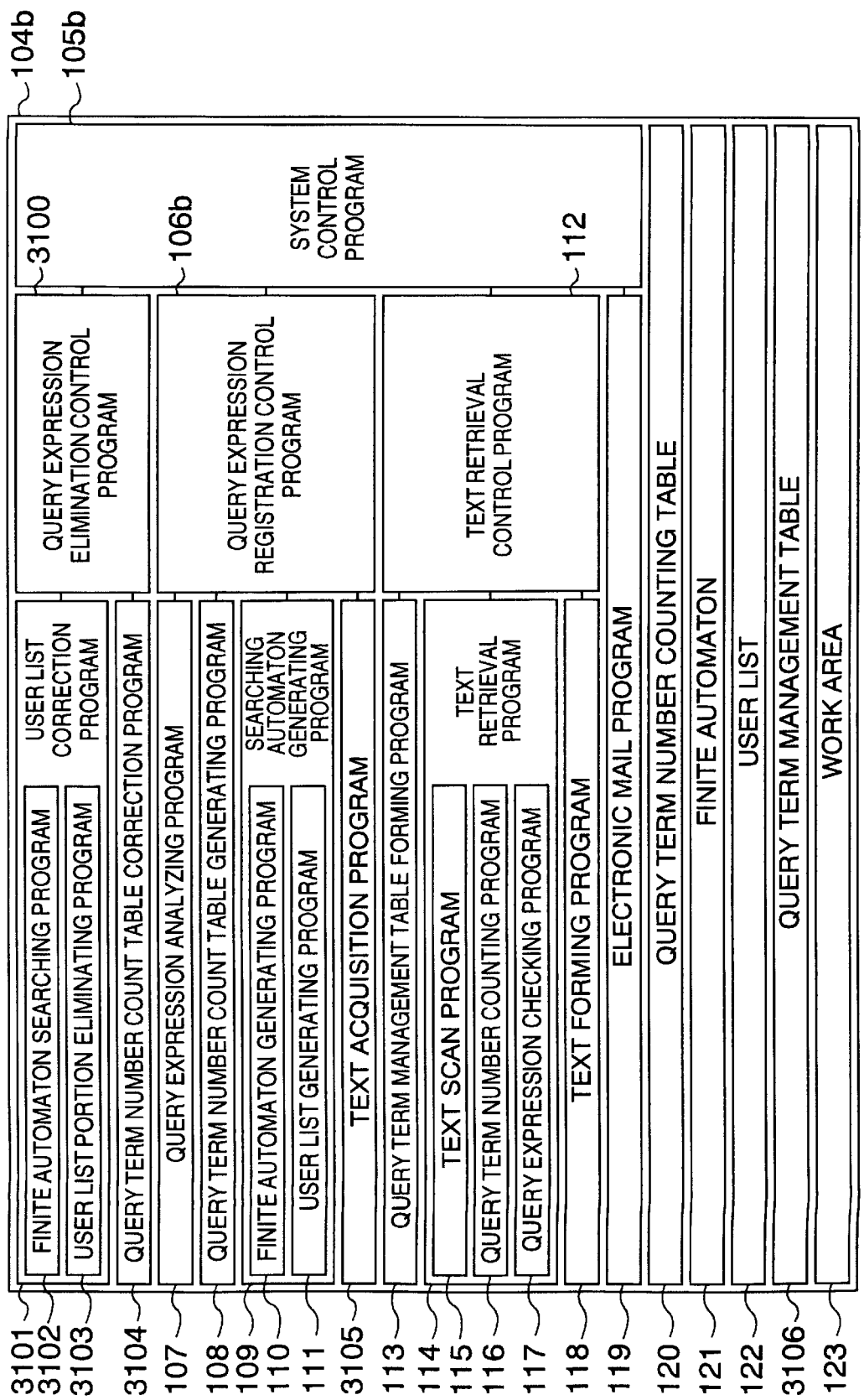
FIG. 27 is a construction diagram of the third embodiment of the invention.

FIG. 27 shows the arrangement in the main memory 104.

As illustrated in FIG. 27, the main memory 104b has provided therein a query term management table 3106, and a query expression elimination control program 3100 under the control of system control program 105b.

In addition, under the control of the query expression elimination control program 3100 there are provided the user list correction program 3101 and query term number count table correction program 3104, and under the control of the query expression registration control program 106b is provided the query term management table generating program 3105.

The user list correction program 3101 is constructed by the finite automaton searching program 3102 and the user list portion eliminating program 3103.

The above programs can also be stored in a recording medium capable of reading and writing on a computer, such as a hard disk apparatus or floppy disks.

The system control program 105b is booted by the command which the operator of the news clipping system pressed keys on the keyboard 101.

The query expression elimination control program 3100, query expression registration control program 106b and text retrieval control program 112 are booted by the system control program 105b in accordance with the commands to register query expressions and to eliminate from the user 126, and the distribution of text from the news source 125, thus controlling the user list correction program 3101 and query term number count table correction program 3104, the query expression analyzing program 107, query term number count table generating program 108, searching automaton generation program 109 and query term management table generating program 3105, and the text acquisition program 113, text retrieval program 114 and text forming program 118.

A description will be made of the process contents of the news clipping system of this embodiment.

Figure 28:
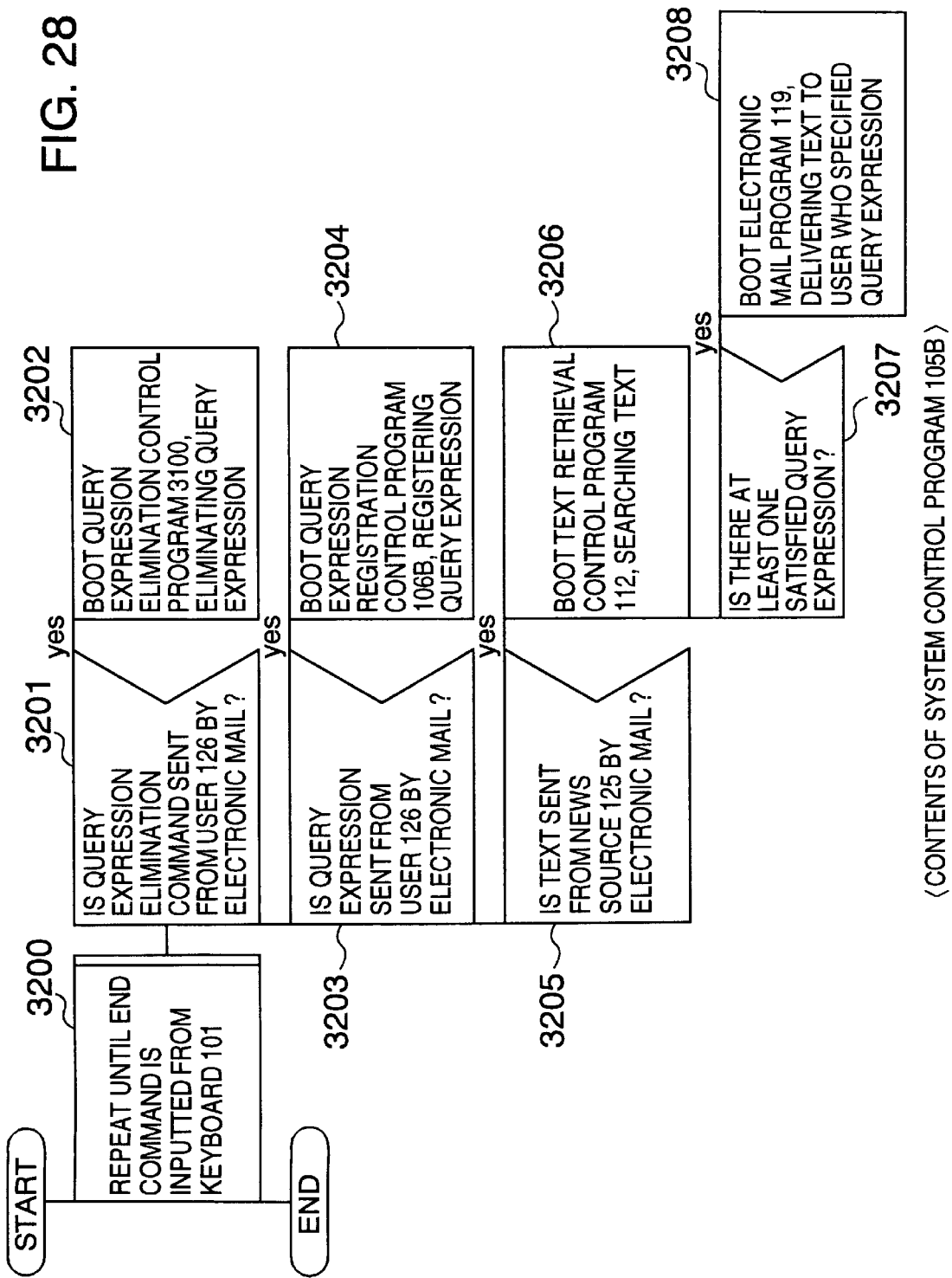
FIG. 28 is a PAD diagram showing the process contents of a system control program 105b.

First, the process contents of the system control program 105b will be described with reference to the PAD diagram of FIG. 28.

In the system control program 105b, at step 3200 the following steps are repeatedly executed until the end command is inputted through the keyboard 101.

That is, at step 3201 it is checked if the command to eliminate the query expression is transmitted by means of electric mail.

If the command is sent, the program goes to step 3202, where the query expression elimination control program 3100 is booted, eliminating the query expression.

Then, at step 3203 it is checked if a query expression is transmitted from the user 126 by means of electronic mail.

If the query expression is supplied, the program goes to step 3204, where the query expression registration control program 106b is booted, registering the query expression.

At step 3205 it is checked if a text is distributed from the news source 125 by means of electronic mail.

If the text is transmitted, the program goes to step 3206, where the text search control program 112 is booted, searching the text.

Then, at step 3207 the result from the text retrieval in the text retrieval control program 112 is examined. If it is decided that at least one query expression is satisfied, the program goes to step 3208, where the electronic mail program 119 is booted, distributing the text by means of electronic mail to the user which specified the satisfied query expression.

The above operations are the process contents of the system control program 105b.

A description will be made of the process contents of the query expression elimination control program 3100 not provided in the first embodiment and of the query expression registration control program 106b different in its process from the first embodiment.

Figure 29:
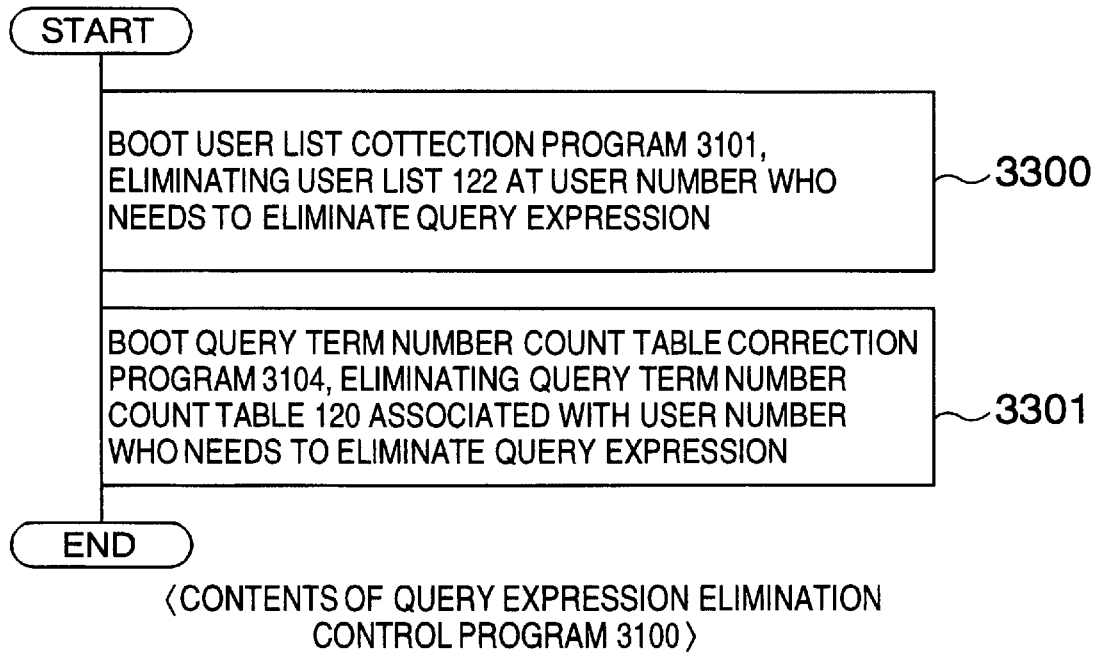
FIG. 29 is a PAD diagram showing the process contents of a query expression elimination control program 3100.

The query expression eliminating process of the query expression elimination control program 3100 will be mentioned with reference to the PAD diagram of FIG. 29.

The query expression elimination control program 3100 is booted by the system control program 105b.

In this program, at step 3300 the user list correction program 3101 is booted, eliminating the user list 122 corresponding to the user number who ordered to eliminate a query expression.

At step 3301, the query term number count table correction program 3104 is booted, eliminating the query term number count table 120 corresponding to the user number who ordered to eliminate a query term.

Figure 30:
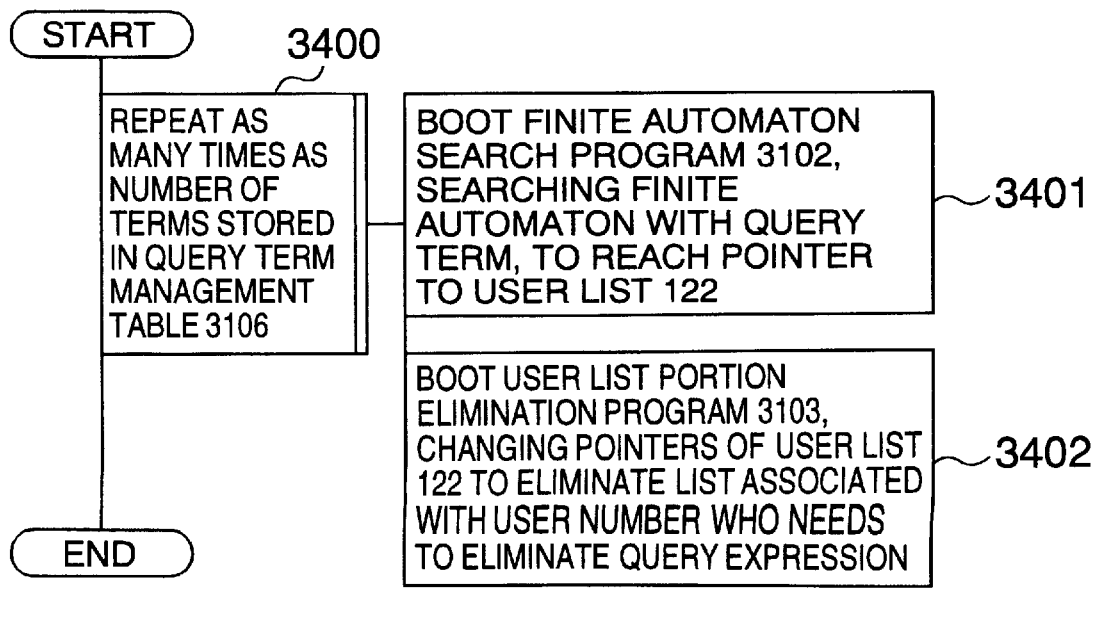
FIG. 30 is a PAD diagram showing the process contents of a user list correction program 1301.

FIG. 30 shows the detailed process contents of the user list correction program 3101.

In this program, at step 3400 the following steps are repeatedly executed as many times as the number of query terms stored in the query term management table 3106. The query term management table 3106 will be described later.

That is, at step 3401 the finite automaton search program 3102 is booted, searching the finite automaton 121 in association with query terms so as to obtain pointers to the user list 122.

Finally, at step 3402 the user list portion elimination program 3103 is booted, eliminating the list associated with the user number who ordered to eliminate the query expression by changing the pointers to the user list 122.

The above operations are the process contents of the query expression elimination control program 3100 for query expression elimination.

The processes of the query expression registration control program 106b will be mentioned with reference to the PAD diagram of FIG. 31.

The query expression registration control program 106b is booted by the system control program 105b.

Of the processes of this program shown in FIG. 31, the processes of the query expression analyzing program 107, query term number count table generating program 108 and searching automaton generation program 109 at steps 3500 to 3502 are the same as in the first embodiment.

The query expression registration control program 106b boots the query term management table generating program 3105 at step 3503, making the query terms included in the query expression be stored in the query term management table 3106.

FIG. 32 shows an example of the generated query term management table 3106.

The query term management table 3106 shown in FIG. 32 is generated from the three query expressions of ["text" and ("retrieval or "search")] of user 1, ["edit" and ¬ ("text" or "data")] of user 2 and [¬ ("retrieval" and "data")] of user 3.

The above mentioned construction is of the embodiment of the news clipping system according to the invention.

The process procedure of the query expression elimination control program 3100 in this embodiment as shown in FIG. 29 will be described in detail with reference to FIG. 33.

The user list correction program 3101 at step 3300 of the query expression elimination control program 3100 shown in FIG. 29 will be mentioned first.

The user list correction program 3101 is booted by the query expression elimination control program 3100. FIG. 30 shows the detailed processes of this program.

In this program, at step 3400 the processes of steps 3401 and 3402 are repeatedly executed as many times as the number of query terms stored in the query term management table 3106.

At step 3401 the finite automaton searching program 3102 is booted, searching the finite automaton 121 in association with query terms to obtain pointers to the user list 122.

At step 3402 the user list portion elimination program 3103 is booted, eliminating the user list corresponding to the user number who ordered to eliminate the query expression.

Figure 33:
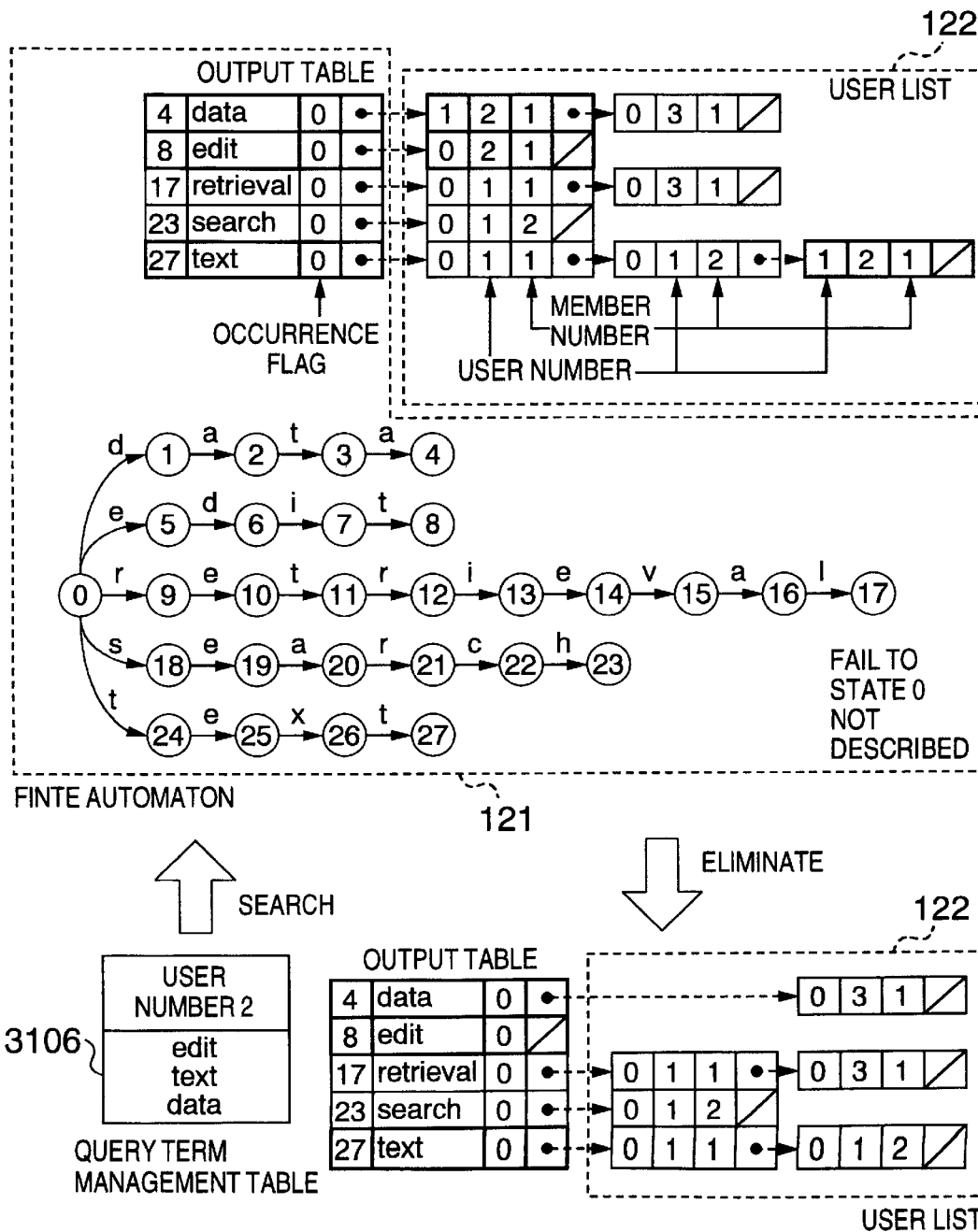
FIG. 33 is a diagram for explaining the user list correction process.

FIG. 33 shows an example of the processes of the user list correction program 3101.

This figure shows an example of the case for eliminating the query expression of user 2 which includes "edit", "text" and "data".

The query term management table 3106 has stored therein "edit", "text" and "data" for which repetitive processing is performed.

In the repetitive processes, at step 3401 the finite automaton 121 is scanned for "edit", "text" and "data", producing pointers to the user list 122.

At step 3402, the user list 122 associated with user number "2" is eliminated along the user list 122.

The portions of user list 122 corresponding to user number "2" are eliminated as illustrated.

A description will be made of the processes of the query term number count table correction program 3104 at step

3301 of the query expression elimination control program 3100 shown in FIG. 29.

The query term number count table correction program 3104 is booted following the user list correction program 3101 by the query expression elimination control program 3100.

This program eliminates the query term number count table 120 associated with the user number who ordered to eliminate the query expression.

FIG. 34 shows an example of the processes of this program.

The query term number count table associated with user number 2 is eliminated as illustrated.

The above operations are the detailed procedure for the query expression elimination in the query expression elimination control program 3100 of this embodiment.

A detailed description will be made of the process procedure of the query expression registration control program 106*b* in this embodiment shown in FIG. 31.

Of the process contents of this program shown in FIG. 31, the query expression analyzing program 107, query term number count table generating program 108 and searching automaton generation program 109 at steps 3500 to 3502 are the same as in the first embodiment.

A description will be made of the detailed process contents of the query term management table generating program 3105 at step 3503.

The query term management table generating program 3105 is booted following the searching automaton generation program 109 by the query expression registration control program 106*b*.

In this program, the query terms included in the query expression as a result of analyzing the query expression analyzing program 107 are stored in the query term management table 3106.

FIG. 35 shows an example of the processes of this program.

As illustrated, the user of user number 2 specified the query expression of ["pattern" and "matching"], or [texts including both "pattern" and "matching"].

The two query terms of "pattern" and "matching" can be obtained by analyzing this query expression according to the query expression analyzing program 107.

These query terms are stored in the query term management table 3106 to be associated with the user number. As illustrated, the "pattern" and "matching" are stored in the area corresponding to user number 2.

The above operations are the detailed procedure for the query expression registration in the query expression registration control program 106*b*.

Thus, according to the invention, it is possible to easily eliminate the previous information from the user list by managing for each user the query terms included in the query expression which each user specified, and when the user orders to eliminate the query expression, by scanning the finite automaton in association with the managed query terms and changing the pointers to the user list.

Accordingly, the texts acquired from a plurality of news sources are scanned only once on the basis of the query expressions registered by the users so that decision can be made of whether the query expressions of a plurality of users are satisfied or not. If one or more of the query expressions are satisfied, the associated texts are immediately transmitted to the users of which the query expressions are satisfied.

Therefore, the news clipping system of the invention is able to alter the query expressions whenever the users request to change.

While the command to eliminate query expressions and the command to register are separately transmitted in this embodiment, both command to eliminate query expressions and command to register, or a command to alter may be sent simultaneously, if the elimination process and registration process are sequentially executed.

In addition, while this embodiment is the addition of the query expression eliminating process to the first embodiment, this process may be added to the second embodiment.

What is claimed is:

1. A news clipping method for a news clipping system to which query terms and text data are supplied, comprising:
   a step of storing a plurality of query expressions each having one or more query terms specified by a plurality of users;
   a step of providing a query term number count table having stored therein the number of query terms included in each of said plurality of query expressions of said users;
   a step of providing a user list of said query terms including terms common to said users for said plurality of users;
   a step of scanning said text data fed to said news clipping system in search of said query terms;
   a step of providing a query term occurrence count table having stored therein occurrence count of different query terms that are found for each user in said text data while said text data is being scanned with reference to said user list; and
   a step of comparing, for each user, the query term number of said query term number count table with the occurrence count of said query term occurrence count table to search for users whose query term number and occurrence count are coincident with each other.

2. A news clipping method according to claim 1, further comprising a step of delivering said text data to said users whose query term number and occurrence count are coincident with each other.

3. A news clipping method according to claim 2, wherein said text data scanning step is executed only once before said text data delivering step.

4. A news clipping method according to claim 2, wherein said multiple strings matching table is a finite automaton.

5. A news clipping method according to claim 2, wherein said query expression deciding step comprises:
   a step of calculating the occurrence count of query terms matched by said text scanning step for each user with reference to said user list; and
   a step of comparing the occurrence count of query terms calculated by said query term calculating step with the number of query terms stored in said query term number count table, and deciding that the corresponding query expression including said query terms is satisfied when a coincidence is found from said comparison.

6. A news clipping method comprising:
   a step of registering a plurality of query expressions each including one or more query terms specified by a plurality of users in order to search text data acquired from one or more news sources; and
   a text clipping step of once scanning said text data in order to decide if said query expressions are satisfied in said text data when said text is acquired, and distributing said text data to the user who specified the query expression satisfied by the above decision.

7. A news clipping method according to claim 6, wherein said registering step comprises:
   a step of extracting all query terms from said query expressions;
   a step of generating a query term number count table for storing management information including said users and the numbers of all the query terms extracted from said query expressions of said users;
   a step of generating a multiple strings matching table to which reference is made when all the query terms extracted from said query expressions are matched while said text data is being once scanned; and
   a step of generating a user list including identifiers of said users who specified said query expressions, in association with the query terms extracted from said query expressions, and said text clipping step comprises:
   a text scanning step of scanning said text data with reference to said multiple strings matching table when decision is made of whether or not said query expressions are satisfied in the text data, thereby matching all the query terms extracted by said query expression analyzing step; and
   a step of deciding if said query expressions are satisfied in said text data by referring to said query terms matched by said text scanning step, said user list and said query term number count table.

8. A news clipping method comprising:
   a step of registering delivery condition expressions including text delivery conditions which a plurality of users or system operators specified for text data;
   a text retrieval step of deciding if said plurality of query expressions are satisfied in said text data by once scanning said text data; and
   a step of distributing said text data to the user whose query expression is found to be satisfied by said text retrieval step, when said delivery condition registered by said delivery condition registering step is satisfied.

9. A news clipping method according to claim 8, wherein said delivery condition registering step comprises:
   a delivery condition expression analyzing step of extracting identifiers of users who need to specify delivery conditions, and the associated delivery conditions from said delivery condition expressions; and
   a step of generating a delivery condition management table which has stored therein the user's identifiers and delivery conditions extracted from said delivery condition expressions at said delivery condition analyzing step, and said text distribution control step comprises:
      a step of deciding if said delivery conditions are satisfied referring to said delivery condition management table; and
      a step of distributing said text data to the user when said delivery condition is decided to be satisfied by said distribution condition deciding step.

10. A news clipping method according to claim 9, wherein said delivery conditions include distribution time, number of items to be distributed, and delay time from text retrieval to distribution.

11. A news clipping method comprising:
   a query expression analyzing step of extracting all the query terms from query expressions specified by a plurality of users;
   a step of generating a query term number count table which stores management information including said users and the number of all said query terms extracted from said query expressions of said users;
   a step of generating a multiple strings matching table to which reference is made when text data is once scanned so that the corresponding terms occurring during the scanning can be matched with all said query terms extracted from said query expressions;
   a step of generating a user list having identifiers of said users who specified said query expressions, in association with said query terms extracted from said query expressions, so that said terms and said identifiers are connected as a list in association with each other; and
   a query expression management table eliminating step of eliminating information associated with elimination-indicated ones of said query expressions from said query term number count table and said user list.

12. A news clipping method according to claim 11, further comprising:
   a query term management table generating step of generating, by said query expression analyzing step, a query term management table which has stored therein said extracted query terms;
   a user list eliminating step of eliminating, from said user list, said identifiers of said users who specified said query expressions associated with said query terms included in said elimination-indicated query expressions with reference to said query term management table; and
   a query term number count table eliminating step of eliminating management information of said users associated with said elimination-indicated query expressions from said query term number count table.

13. A news clipping system comprising:
   query expression analyzing means for extracting all query terms from query expressions specified by a plurality of users;
   means for generating a query term number count table which has stored therein management information including said users and the number of all said query terms extracted from said query expressions of said users;
   means for generating a multiple strings matching table to which reference is made when text data is once scanned so that the corresponding terms occurring during the scanning can be matched with all the query terms extracted from said query expressions;
   means for generating a user list having identifiers of said users who specified said query expressions in association with said query terms extracted from said query expressions, said user identifiers and said query terms being connected as a list in association with each other;
   means for scanning said text data with reference to said multiple strings matching table to match the corresponding terms occurring during the scanning with all said query terms extracted by said query expression analyzing means when decision is made of whether or not said query expressions are satisfied in said text data; and
   means for deciding if said query expressions are satisfied in said text data by referring to said query terms matched by said text scanning means, said user list and said query term number count table.

14. A news clipping system according to claim 13, wherein said multiple strings matching table is a finite automaton.

15. A news clipping system according to claim 13, wherein said query expression deciding means comprises:
query term occurrence count calculating means for calculating with reference to said user list the occurrence count of query terms matched for each user by said text scanning means; and
means for comparing the occurrence count of query terms calculated by said query term occurrence count calculating means with the number of query terms stored in said query term number count table, and deciding that the associated query expression including said query terms is satisfied when a coincidence occurs between those numbers.

16. A news clipping system comprising:
means for registering delivery condition expressions including delivery conditions specified for text delivery by a plurality of users or system operators;
text search means for deciding if said plurality of query expressions are satisfied in said text data by scanning only once said text data;
text delivery control means for distributing said text data to the user whose query expression is satisfied by said text search means when the corresponding one of said delivery conditions registered by said delivery condition expression registering means is satisfied;
delivery condition expression analyzing means for extracting the identifiers of said users who need to specify delivery conditions, and said delivery conditions from said delivery condition expressions; and
means for generating a delivery condition management table which has stored therein said user identifiers and said delivery conditions extracted from said delivery condition expressions by said delivery condition analyzing means, said text delivery control means comprising:
means for deciding if said delivery conditions are satisfied with reference to said delivery condition management table; and
text delivery means for distributing said text data to the corresponding user when said delivery condition is decided to be satisfied by said delivery condition deciding means.

17. A news clipping system according to claim 16, wherein said delivery conditions include distribution time, number of items to be distributed and delay time from text retrieval to distribution.

18. A news clipping system comprising:
means for registering query expressions specified by a plurality of users;
query expression analyzing means for extracting all query terms from said query expressions;
means for generating a query term number count table which has stored therein management information including said users and the number of all query terms extracted from said query expressions of said users;
means for generating a multiple string matching table to which reference is made when the terms occurring in text data are matched with all the query terms extracted from said query expressions by scanning only once said text data;
means for generating a user list having the identifiers of said users who specified said query expressions in association with the query terms extracted from said query expressions, said identifiers and said query terms being connected as a list in association with each other; and
query expression management table eliminating means for eliminating information associated with the elimination-indicated query expressions from said query term number count table and said user list.

19. A news clipping system according to claim 18, wherein said query expression registering means further comprises:
means for generating a query term management table having stored therein said query terms extracted from said query expression analyzing means, and said query expression management table eliminating means comprises:
user list eliminating means for eliminating from said user list said identifier of said user who specified said query expression associated with said query terms included in the elimination-indicated query expression with reference to said query term management table; and
query term number count table eliminating means for eliminating management information associated with the elimination-indicated query expressions from said query term number count table.

20. A recording medium having stored therein clipping programs which can be read by a computer and used for a news clipping system into which query terms and text data are inputted comprising:
a query term number count table having the number of query terms included for each user in each of a plurality of query expressions of users;
a user list having said users which specified said plurality of query terms;
a term occurrence count table having the occurrence count of different terms found for each user in said text data; and
a list of users associated with the coincidence between the query term number of said query term number count table and the occurrence count of said term occurrence count table.

21. A recording medium according to claim 20, wherein said text data is once scanned before the step at which said text data is delivered to the users given on said list.

* * * * *